(12) United States Patent
Prsha et al.

(10) Patent No.: US 7,276,910 B2
(45) Date of Patent: Oct. 2, 2007

(54) COMPACT SELF-TUNED ELECTRICAL RESONATOR FOR BURIED OBJECT LOCATOR APPLICATIONS

(75) Inventors: Jeffrey A. Prsha, San Diego, CA (US); Ray Merewether, La Jolla, CA (US); Edward Denaci, San Diego, CA (US); Christoph H. Maier, San Diego, CA (US); Mark S. Olsson, La Jolla, CA (US)

(73) Assignee: Seektech, Inc., San Diego, CA (US)

( * ) Notice: Subject to any disclaimer, the term of this patent is extended or adjusted under 35 U.S.C. 154(b) by 300 days.

(21) Appl. No.: 11/184,456

(22) Filed: Jul. 19, 2005

(65) Prior Publication Data

US 2007/0018649 A1 Jan. 25, 2007

(51) Int. Cl.
*G01V 3/08* (2006.01)
*H01P 7/00* (2006.01)

(52) U.S. Cl. .................. 324/326; 324/345; 324/347; 333/219; 333/219.2

(58) Field of Classification Search ............... 324/326, 324/331, 345, 347; 333/219, 220–221, 219.1, 333/219.2
See application file for complete search history.

(56) References Cited

U.S. PATENT DOCUMENTS

| | | |
|---|---|---|
| 5,032,805 A | 7/1991 | Elmer et al. |
| 5,055,793 A | 10/1991 | Mulcahey |
| 5,173,835 A | 12/1992 | Cornett et al. |
| 5,212,463 A | 5/1993 | Babbitt et al. |
| 5,721,194 A | 2/1998 | Yandrofski et al. |
| 6,088,214 A | 7/2000 | Malone et al. |
| 6,096,127 A | 8/2000 | Dimos et al. |
| 6,507,476 B1 | 1/2003 | Shaw et al. |
| 6,570,460 B1 | 5/2003 | Dussauby et al. |
| 6,809,604 B2 | 10/2004 | Kawakubo et al. |
| 6,888,714 B2 | 5/2005 | Shaw et al. |

OTHER PUBLICATIONS

Tombak, A., Ayguavives, F.T., Maria, J.P, Stauf, G.T., Kingon, A.I., and Mortazewi, A. "Tunable RF Filters Using Thin Film Abarium Strontium titanate Based Capacitors" EEEE, 5pgs, © 2001.
Harayda, G.M., Omi, A., and Yamamoto, A. "Improve Your Designs with Large Capacitance Value Multi-Layer Ceramic Chip (MLCC) Capacitors" Panasonic Electronic Components, Publication #PG33. 08/10/04.

(Continued)

*Primary Examiner*—Bot LeDynh
(74) *Attorney, Agent, or Firm*—Michael H. Jester

(57) ABSTRACT

A self-tuning resonator for use in a transmitter apparatus for inducing alternating currents in a buried conductor. The resonator is dynamically tuned at frequencies below 500 kHz by exploiting the inherent voltage-variability of net capacitance in multilayer ceramic capacitors. The transmitter apparatus provides improved efficiency and induced output power suitable for use in a man-portable locator system, providing a very high magnetic field output from a physically small battery-powered resonator at frequencies under 500 kHz. The resonator exhibits a very low equivalent series resistance (ESR) and is adaptively returned to a predetermined resonant frequency responsive to any changes in resonance arising from phenomena such as component heating, thereby supporting very high tank circuit currents from battery-powered source to produce very high magnetic flux output.

31 Claims, 20 Drawing Sheets

OTHER PUBLICATIONS

Duffy, D.P. "Finding Buried Utilities Before they Find You" Grading & Excavation Contractor, © 2001 Forester Communications, Inc.

"Tunability—an enabling Technology for Wireless" © 2003, Agile Materials & Technologies, Inc. pp. 1-4.

Al-shareef, H. N., Dimos, D., Raymond, M.V. and Schwartz, R.W. "Tunability and Calculation of the Dielectric Constand of Capacitor Structures with Interdigital Electrodes" Jornal of Electroceramics 1:2, 145-153, 1997, © 1997 Kluwer Academic Publishers, Boston.

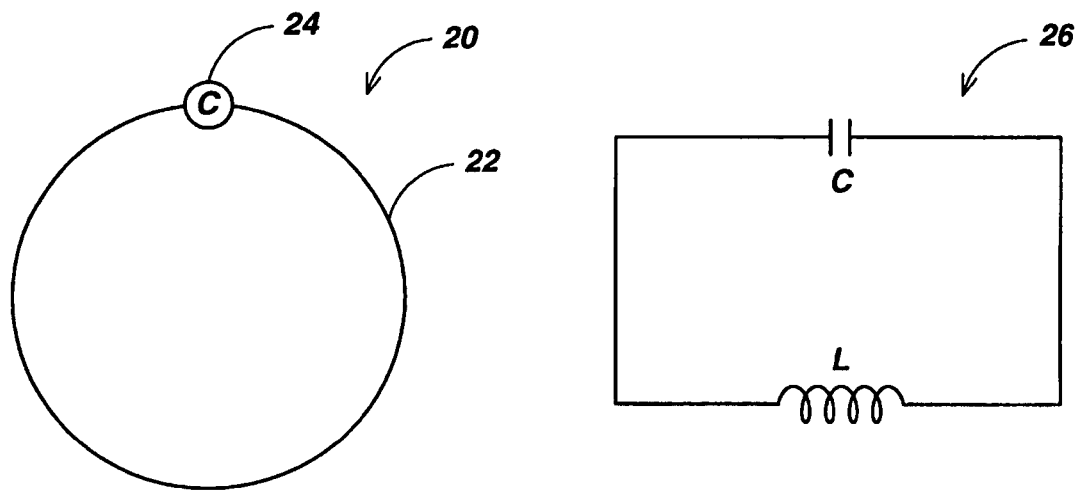
FIG. 1A
PRIOR ART
FIG. 1B
PRIOR ART
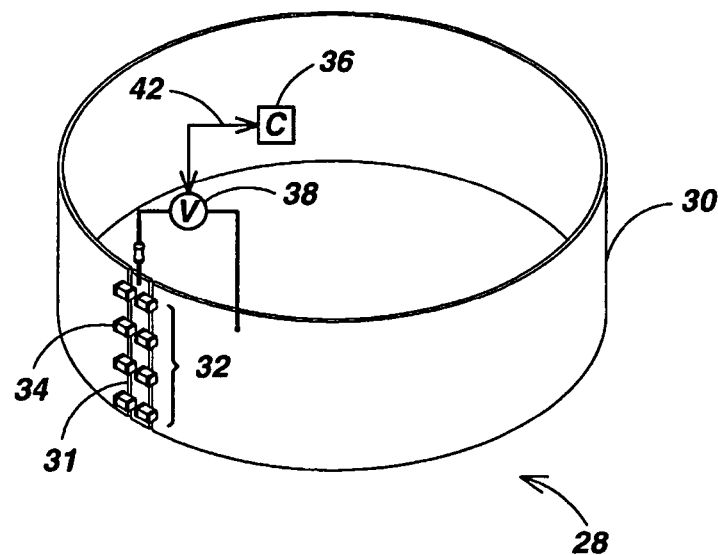
FIG. 2

COMPACT SELF-TUNED ELECTRICAL RESONATOR FOR BURIED OBJECT LOCATOR APPLICATIONS

CROSS-REFERENCES TO RELATED APPLICATIONS

This application is related by common inventorship and subject matter to the commonly-assigned patent application Ser. No. 10/268,641, published on Apr. 15, 2004 as U.S. patent application Ser. No. 2004/0070399 A1, which is entirely incorporated herein by this reference. This application is also related by common inventorship and subject matter to the commonly-assigned patent application Ser. No. 10/308,752, published on Apr. 15, 2004 as U.S. patent application Ser. No. 2004/0070525 A1, which is entirely incorporated herein by this reference. This application is also related by common inventorship and subject matter to the commonly-assigned patent application Ser. No. 10/956,328 filed on Oct. 1, 2004, patent application Ser. No. 11/054,776 filed on Feb. 9, 2005, and patent application Ser. No. 11/106,894 filed on Apr. 15, 2005, which are both entirely incorporated herein by this reference.

BACKGROUND OF THE INVENTION

1. Field of the Invention

This invention relates generally to systems for locating and tracing buried objects and more particularly to a system for inducing alternating current in a buried conductor to facilitate the detection and tracing thereof by means of an automated signal detection system.

2. Description of the Related Art

There are many situations where is it desirable to locate buried utilities such as pipes and cables. For example, before starting any new construction that involves excavation, worker safety and project economic concerns require the location and identification of existing underground utilities such as underground power lines, gas lines, phone lines, fiber optic cable conduits, cable television (CATV) cables, sprinkler control wiring, water pipes, sewer pipes, etc., collectively and individually herein denominated "buried objects." As used herein, the term "buried objects" includes objects located inside walls, between floors in multi-story buildings or cast into concrete slabs, for example, as well as objects disposed below the surface of the ground. If excavation equipment such as a backhoe hits a high voltage line or a gas line, serious injury and property damage may result. Unintended severing of water mains and sewer lines generally leads to messy and expensive cleanup efforts. The unintended destruction of power and data cables may seriously disrupt the comfort and convenience of residents and bring huge financial costs to business.

Accordingly, the art is replete with proposed solutions to the buried object locating problem. For example, it is known to locate buried ferromagnetic objects either by detecting a localized change in free-space permeability with an inductive circuit element or by using a magnetic sensor to detect the fixed magnetic field (internal magnetic moment) emanating from the object. The presence of such ferromagnetic objects also distorts the Earth's magnetic field in a manner that is known to have utility for locating. Some buried cables, such as power lines and some communication lines, for example, are already energized and therefore characterized by the emission of an electromagnetic signal that includes a non-zero frequency magnetic field that may be detected by a magnetic sensor. As another example, an external transmitter, beacon or duct probe (a "sonde") is an external electromagnetic signal source having well-known utility for marking the location of any non-conductive buried object into which it may be physically introduced. A sonde typically includes a coil of wire wrapped around a ferromagnetic core that is packaged for insertion into a buried nonconductive conduit, such as a plastic utility runway or a concrete water pipe. Still other buried objects, such as conductive lines and pipes, may be located by first applying an external electromagnetic signal to the object to induce an alternating current therein, thereby energizing the object with a nonzero frequency magnetic field that may be detected by a magnetic sensor. For example, an external electrical signal source (transmitter) having a frequency in the range of approximately 4 Hz to 500 kHz has a well-known utility for energizing conductive objects by direct electrical coupling to permit their location. These examples of active and passive location of buried long conductors are also commonly denominated "line tracing."

The above commonly-assigned patent applications propose several improvements to the magnetic field measurement and line locating art, including the use of simultaneous measurement of magnetic field vectors in a plurality of independent frequency regions and the introduction of multiple 3D sensor arrays for measuring magnetic field vectors and the introduction of an improved Graphical User Interface (GUI) for line tracing.

Employing a directly-coupled external transmitter to induce an alternating current in a buried conductive objects is useful, provided that the buried line is accessible for the conductive attachment of the transmitter output signal. When there is no conductive access to the buried conductor, such a transmitter may alternatively be used to indirectly induce an alternating current in the buried line, but this approach has several well-known disadvantages. For example, when the transmitter is placed at a first location above the buried line and operated to radiate an electromagnetic field in the 4 Hz to 500 kHz region, an alternating current is induced in the line such that a locator array tuned to the same frequency may be deployed at a second location removed from the transmitter to detect the buried line. Any electromagnetic field energy that propagates above ground to the locator array directly from the transmitter tends to interfere with the accuracy of the desired locator measurement. However, the above-ground transmission of energy is significantly less efficient than the underground transmission, which arises from an electrical current flowing in a continuous conductor. This indirect-coupling active location technique is therefore useful over a range of transmitter and locator separations.

The minimum requisite separation between locator and transmitter may be reduced by providing the transmitter with a directional radiation pattern and directing it orthogonally to the locator direction. The maximum feasible separation between locator and transmitter is generally proportional to the transmitter output energy that may be successfully coupled to the underground line. This in turn depends on the efficiency with which the transmitter converts available battery power to induced magnetic flux. If the metallic line is buried deeply, a transmitter positioned on the surface must produce a high magnetic flux to penetrate to the line depth. In addition to a high transmitter flux, the magnetic flux pattern should also be widely dispersed in the downward direction to reach a deeply buried line. Thus, there is a recognized need in the art for a strong and effective induced signal, which must be provided by battery-powered transmitter apparatus that is easily portable.

U.S. Pat. No. 5,055,793 issued to Mulcahy discloses a battery-powered transmitter circuit supported from a portable housing, a ferrite core antenna incorporated within the transmitter circuit, and a separate tank circuit that includes a loop antenna and a capacitor. The tank circuit is tuned to a predetermined operating frequency and nonconductively coupled to the ferrite core antenna, which transfers magnetic energy from a signal generator to the loop antenna. The magnetic field induced from the loop antenna inductively coupled to the buried line to create an alternating current therein. Mulcahy neither considers nor suggests solutions to the problem of tuning drift, which arises from temperature changes and aging in tank circuits and can reduce transmitter efficiency and magnetic flux output. Moreover, Mulcahy's apparatus must be returned to operate at an alternate frequency, which is often necessary in modern systems intended for use where the land that is to be excavated is traversed or crisscrossed by several different utilities such as an electrical power cable, a water line, a gas line, a sewer pipe and a communications line. It is highly desirable to be able to determine their paths and their depths all at the same time by using, for example, several different signals at different frequencies for application to the same underground object or even to different underground objects.

Accordingly, there is still a clearly-felt need in the art for an improved compact self-tuned electrical resonator suitable for generating a high magnetic flux from a battery-powered generator. These unresolved problems and deficiencies are clearly felt in the art and are solved by this invention in the manner described below.

SUMMARY OF THE INVENTION

This invention solves the above problem by providing a self-tuning resonator for use in a transmitter apparatus for inducing alternating currents in a buried conductor. The resonator of this invention may be dynamically tuned at frequencies below 500 kHz by exploiting for the first time the disadvantageous voltage-variability of net capacitance in multilayer ceramic capacitors.

It is a purpose of this invention to provide a man-portable locator system transmitter having improved efficiency and induced output power.

It is another purpose of this invention to provide a very high magnetic field output from a physically small battery-powered resonator at frequencies under 500 kHz.

It is an advantage of the resonator of this invention that it has very low equivalent series resistance (ESR) and is adaptively returned to a predetermined resonant frequency responsive to any changes in resonance arising from phenomena such as component heating, thereby supporting very high tank circuit currents from battery-powered source to produce very high magnetic flux output.

In one aspect, the invention is an electrical resonator having a primary resonant frequency value $f_R$, the resonator including a conductor having an inductance value L; a plurality of capacitors coupled to the conductor having a net capacitance value C disposed to provide a primary resonant frequency value $f_R$<500 kHz, wherein the capacitance value of at least one of the capacitors varies as a function of the voltage drop across it; and a controller coupled to the at least one of the capacitors, including a first circuit for generating a control voltage $V_C$ corresponding to the difference between a first predetermined resonant frequency value $f_{R1}$ and the primary resonant frequency value $f_R$<500 kHz, and a second circuit for applying the control voltage $V_C$ to the capacitor, whereby the capacitance value C is controlled to produce a primary resonant frequency value $f_R=f_{R1}$.

In another aspect, the invention is a transmitter apparatus for inducing alternating current in a buried conductor, including an electrical power source for generating an alternating current and an electrical resonator having a primary resonant frequency value $f_R$, the resonator including a conductor having an inductance value L; a plurality of capacitors coupled to the conductor having a net capacitance value C disposed to provide a primary resonant frequency value $f_R$<500 kHz, wherein the capacitance value of at least one of the capacitors varies as a function of the voltage drop across it; and a controller coupled to the at least one of the capacitors, including a first circuit for generating a control voltage $V_C$ corresponding to the difference between a first predetermined resonant frequency value $f_{R1}$ and the primary resonant frequency value $f_R$<500 kHz, and a second circuit for applying the control voltage $V_C$ to the capacitor, whereby the capacitance value C is controlled to produce a primary resonant frequency value $f_R=f_{R1}$.

In yet another aspect, the invention is a human-portable locator system for locating a buried conductor, including a transmitter apparatus for inducing alternating current in the buried conductor, with an electrical power source for generating an alternating current and an electrical resonator having a primary resonant frequency value $f_R$, the resonator including a conductor having an inductance value L; a plurality of capacitors coupled to the conductor having a net capacitance value C disposed to provide a primary resonant frequency value $f_R$<500 kHz, wherein the capacitance value of at least one of the capacitors varies as a function of the voltage drop across it; and a controller coupled to the at least one of the capacitors, including a first circuit for generating a control voltage $V_C$ corresponding to the difference between a first predetermined resonant frequency value $f_{R1}$ and the primary resonant frequency value $f_R$<500 kHz, and a second circuit for applying the control voltage $V_C$ to the capacitor, whereby the capacitance value C is controlled to produce a primary resonant frequency value $f_R=f_{R1}$; a sensor array for producing a plurality of sensor signals representing an electromagnetic field emission arising from the alternating current in the buried conductor; a processor coupled to the sensor array for producing location data signals representing a location of the electromagnetic field emission corresponding to the sensor signals; and a user interface coupled to the processor for reporting to a user a location for the buried conductor.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIGS. 1A-B are schematic diagrams illustrating a split-ring resonator from the prior art;

FIG. 2 is a schematic perspective view of a simple cylinder resonator embodiment of this invention;

DETAILED DESCRIPTION OF THE EMBODIMENTS

Figure 3A:
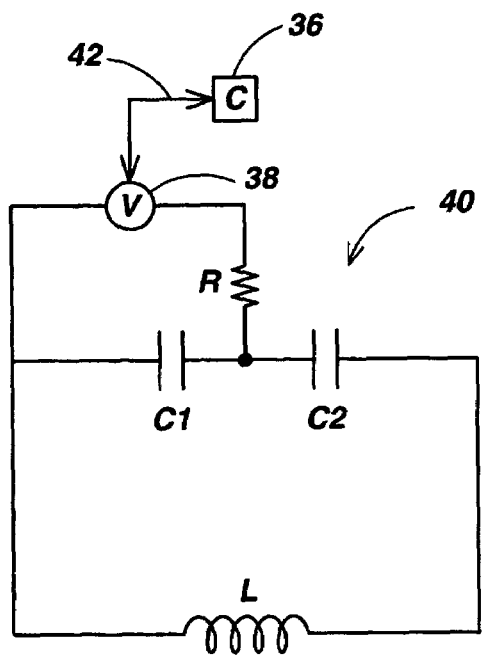
FIG. 3A is a schematic diagram illustrating the ring resonator embodiment of FIG. 2 showing lumped capacitances equivalent to a capacitor plurality.

FIG. 1A is a schematic diagram illustrating a split-ring resonator 20 from the prior art, showing the conductive ring element 22 and the nonconductive gap element 24 associated with a "split" in ring 22. FIG. 1B shows the electrical equivalent circuit 26 of resonator 20 wherein the lumped inductor L and capacitor C represent the electrical equivalent values of ring element 22 and gap element 24, respectively. As is well-known in the electrical arts, resonator 20 presents an electrical impedance $Z=R+j(\omega L-1/\omega C)$, where R is the total lossy resistance of the circuit elements and $(\omega L-1/\omega C)$ is the total reactance of the circuit elements, which is zero for some value of $\omega=\operatorname{sqrt}(1/LC)=\omega_R=2\pi f_R$, where $f_R$ is said to be the primary resonant frequency of resonator 20. The primary resonant frequency $f_R$ is usually limited to a very narrow frequency region for a relatively lossless resonator and is subject to uncontrolled drift arising from changes in the lumped equivalent circuit L and C values responsive to heating, aging, external coupling, material nonlinearities and other well-known phenomena.

FIG. 2 is a schematic perspective view of a simple cylinder resonator embodiment 28 of this invention, including a conductive cylinder wall 30 incorporating longitudinal slots exemplified by the longitudinal slot 31 across which are conductively coupled a capacitor plurality 32 exemplified by the multilayer ceramic chip (MLCC) capacitor 34 (FIG. 4A), and the tuning controller 36. Controller 36 is coupled to a voltage supply 38, which produces a bias voltage to control the level of voltage applied to at least one of the MLCC capacitors exemplified by MLCC capacitor 34 for tuning purposes. Voltage supply 38 could be replaced by a switched current source, a charge pump or any other suitable means for providing a bias potential across the tuning capacitors. Voltage supply 38 may also include a conductively-coupled excitation generator for creating current in cylinder resonator 28 at the primary resonant frequency $f_R$, provided that a small bypass capacitor (not shown) is included at the isolation resistor which would be required for low impedance sources such as a voltage supply. Controller 36 includes means for sensing resonant frequency errors and for producing correction signals that are described below with reference to FIGS. 13-15, for example.

Figure 4A:
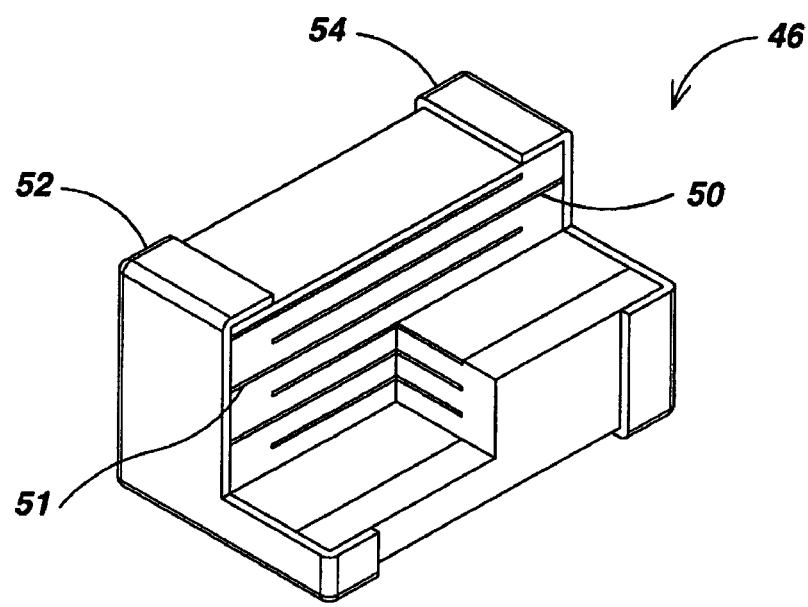
FIG. 4A is a cutaway perspective view of a two-terminal embodiment of a Multi-Layer Ceramic Capacitor (MLCC) from the prior art suitable for use in the cylinder resonator of FIG. 2.

The inventors have found the resonator of this invention to be feasible and cost-effective because of the recent development of very low ESR MLCC capacitors such as capacitors 46 (FIG. 4A). In the past, unavoidable resistive circuit losses (a well-known problem in the art) have prevented the realization of high-quality-factor (high-Q) low-frequency resonators. A high-Q resonator can sustain large currents (even from battery-powered supplies), which serve to produce high magnetic flux levels to support a strong induced magnetic field. Resonator losses arise from electrical resistance in the inductor element, core losses, skin effect conductor losses, leakage in the capacitor, and capacitor dielectric losses. In cylinder resonator 28, conductive cylinder element 30 exhibits high surface area and a single high-conductivity turn with an air core to produce the least possible inductor loss by virtue of minimum conductive and core losses. This arrangement also minimizes the available inductance value L, so that a higher capacitance value C is needed to produce a predetermined primary resonant frequency $f_{R1}$. The large valued MLCC capacitors exhibit low ESR and thus are suitable for use individually or when combined in parallel to achieve man-portable high-Q battery-powered resonators at low transmitter frequencies. Two additional attributes of MLCC capacitors affect the configuration of the resonators. The loss of the capacitors is observed to be reduced by high DC bias voltages (approaching the capacitor's voltage rating) and the loss in the capacitors increases as the AC voltage across the capacitor increases. As a result, a significant reduction in ESR is observed for a series/parallel combination of capacitors that results in the same nominal capacitance value as a single capacitor if a mechanism to apply a DC voltage bias across the individual capacitors is included.

Disadvantageously, the frequency sensitivity of cylinder resonator 28 magnetic field output is very sharp because of the high-Q circuit so that useful and practical fixed element, high-Q resonators are difficult to produce, requiring very accurate component values and very low value drift with temperature and current. The usual methods known in the art for tuning LC oscillators do not readily lend themselves to this resonator design.

However, the inventors have made the unexpectedly advantageous observation that the MLCC capacitor possesses a normally unwanted property that may be exploited to solve the self-tuning problem; that is, the large variation in MLCC capacitance value arising from stress, temperature changes, and applied voltage. Changing any one of these parameters also changes the MLCC capacitor value C. This responsive relationship may be exploited to tune cylinder resonator 28 precisely to a desired frequency value $f_{R1}$ by, for example, the use of controller 36 to adjust the DC voltage output from supply 38 applied to at least one of the MLCC capacitors exemplified by MLCC capacitor 34. That is, changing the DC voltage applied to one or more of the MLCC capacitors provides a useful mechanism for tuning the resonant frequency value $f_R$ to any desired predetermined frequency value $f_{R1}$ within a certain frequency region.

An additional advantage of using a single turn (or minimal number of turns) inductor element embodiment is the reduced voltage imposed on the capacitor element embodiment. Capacitance, voltage rating, low ESR, and minimum package size all work against one another in the capacitor manufacturing art. Accordingly, using a single (or very few) turns in the inductor element permits the designer to accept a low capacitor voltage rating, which permits the use of a high capacitance value, a low ESR, and a relatively small capacitor size. The single turn inductor element such as conductive cylinder element 30 (FIG. 2) is the limiting case.

Figure 3B:
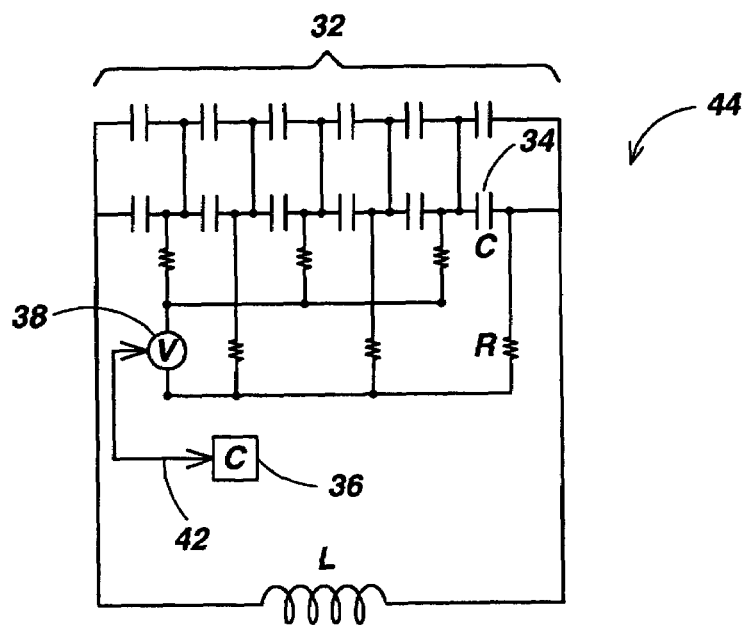
FIG. 3B is a schematic diagram illustrating the ring resonator embodiment of FIG. 2 showing a capacitor plurality disposed to reduce voltage stress.

FIG. 3A is a schematic diagram illustrating the equivalent circuit 40 of cylinder resonator 28 showing capacitors 32 represented by the two equivalent series capacitors, C1 and C2, each of which may represent a lumped equivalent capacitance for a plurality of physical capacitors, for example. For purposes of tuning the net resonator capacitance value $C=C1C2/(C1+C2)$, voltage supply 38 is coupled through an isolation resistor R as necessary to provide a voltage bias across capacitors C1 and C2 in accordance with commands received from controller 36 on the bus 42. FIG. 3B is a schematic diagram illustrating the equivalent circuit 44 of cylinder resonator 28 showing a plurality 32 of physical capacitors coupled to reduce voltage stress and a plurality of isolation resistors exemplified by the isolation resistor R at MLCC capacitor 34, for example. Capacitor plurality 32 is disposed and interconnected into exemplary subgroups for the purpose of reducing the capacitor voltage stress, allowing the capacitor bank to operate at a high DC bias, and minimizing the AC voltage seen by each individual capacitor to obtain a lower BSR. For tuning purposes, voltage supply 38 is coupled through the isolation resistors as necessary to provide a voltage bias across capacitor plurality 32, in accordance with commands received from controller 36 on the bus 42. The isolation resistors are necessary to avoid exposing the LC resonator tank circuit to the low finite impedance of voltage supply 38, which could de-tune and de-Q resonator 28. Alternatively, voltage supply 38 may be replaced with a current source (not shown) or a charge pump (not shown) with appropriate changes in the control logic of controller 36, for example. It may also be useful to simply use a battery (not shown) as an implementation of voltage supply 38 and a manual potentiometer (not shown) as an implementation of controller 36 but such a crude embodiment may oblige the operator to continuously monitor and adjust resonator tuning because of the problem of thermal and voltage related tuning drift. Of course, the resonator of this invention is limited only by the accompanying claims.

Figure 4B:
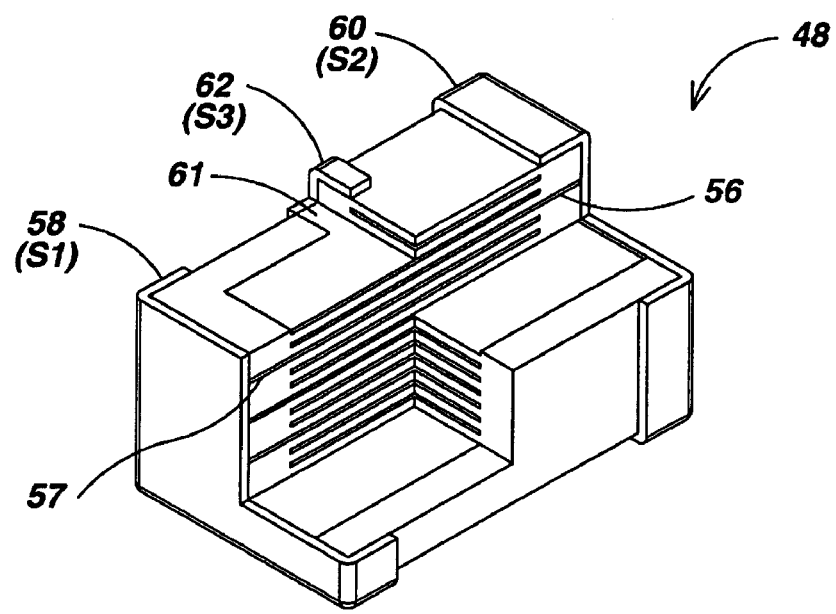
FIG. 4B is a cutaway perspective view of a three-terminal embodiment of a Multi-Layer Ceramic Capacitor (MLCC) of this invention with cyclic interleaving suitable for use in the cylinder resonator of FIG. 2.
Figure 4C:
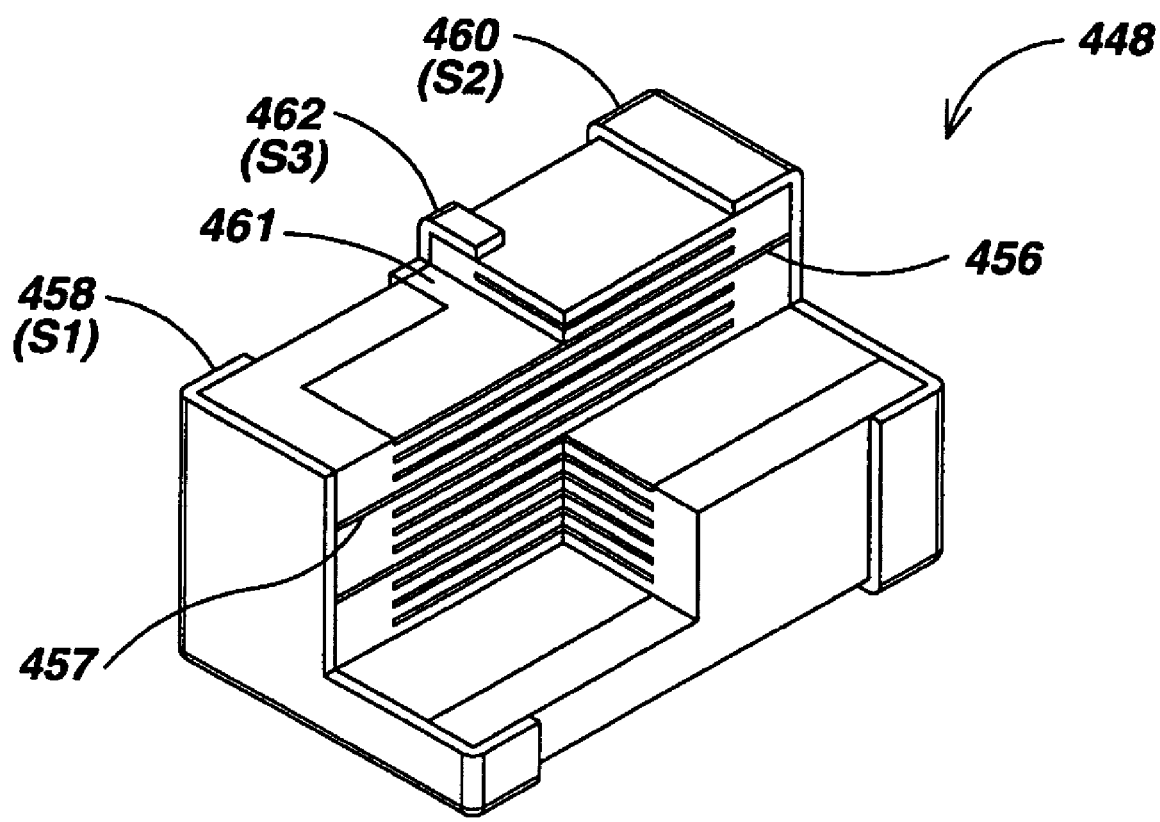
FIG. 4C is a cutaway perspective view of a three-terminal embodiment of a Multi-Layer Ceramic Capacitor (MLCC) of this invention with alternating center-tap interleaving suitable for use in the cylinder resonator of FIG. 2.

FIGS. 4A-C are a cutaway perspective view of MLCC capacitor embodiments suitable for use in cylinder resonator of FIG. 2. FIG. 4A shows a two-terminal MLCC capacitor 46 from the prior art, FIG. 4B shows a three-terminal MLCC capacitor 48 of this invention with cyclic interleaving and FIG. 4C shows a three-terminal MLCC capacitor 448 of this invention with repeated center-tap interleaving.

The two-terminal MLCC capacitor is well-known to practitioners in the electronics art and may be appreciated with reference to, for example, G. M. Harayda et al. [G. M. Harayda et al., "Improve Your Designs with Large Capacitance Value Multi-Layer Ceramic Chip (MLCC) Capacitors," Panasonic Corporation 10 Aug. 2004]. The basic structure of MLCC capacitor 46 includes two sets of interleaved electrodes exemplified by the electrode 50. Each set of interleaved electrodes are conductively coupled to a respective end termination at the respective plated metallization layers 52 and 54 and are disposed in a simple interleaving with the other set of electrodes substantially as shown in FIG. 4A.

The three-terminal MLCC capacitor has been unknown in the art until now. The center-tapped MLCC capacitor 48 is particularly useful in the resonator of this invention, which requires a dual capacitor element to permit application of DC bias voltage, which would normally be short-circuited by the zero-impedance inductor coupled in parallel with the capacitor element of the resonator. Three-terminal MLCC capacitor 48 of this invention (FIG. 4B) includes three sets of electrodes exemplified by the electrode 56. A first set (S1) of interleaved electrodes including the electrode 57 are conductively coupled to the end termination at the plated metallization layer 58. A second set (S2) of interleaved electrodes including electrode 56 are conductively coupled to the end termination at the plated metallization layer 60. A third set (S3) of interleaved electrodes including the electrode 61 are conductively coupled to a medial termination at the plated metallization layer 62, which may serve as a "center-tap" of MLCC capacitor 48. Three-terminal MLCC capacitor 48 has cyclic interleaving so that the electrodes are ordered cyclically from the top down (S1, S3, S2, S1, S3, S2, etc.). Three-terminal MLCC capacitor 448 of this invention (FIG. 4C) also includes three sets of electrodes, exemplified by the electrode 456. A first set (S1) of interleaved electrodes including the electrode 457 are conductively coupled to the end termination at the plated metallization layer 458. A second set (S2) of interleaved electrodes including electrode 456 are conductively coupled to the end termination at the plated metallization layer 460. A third set (S3) of interleaved electrodes including the electrode 461 are conductively coupled to a medial termination at the plated metallization layer 462, which may serve as a "center-tap" of MLCC capacitor 448. Three-terminal MLCC capacitor 448 has alternating center-tap interleaving so that the electrodes alternate with the center-tap from the top down (S1, S3, S2, S3, S1, S3, S2, S3, S1, etc.).

Figure 5A:
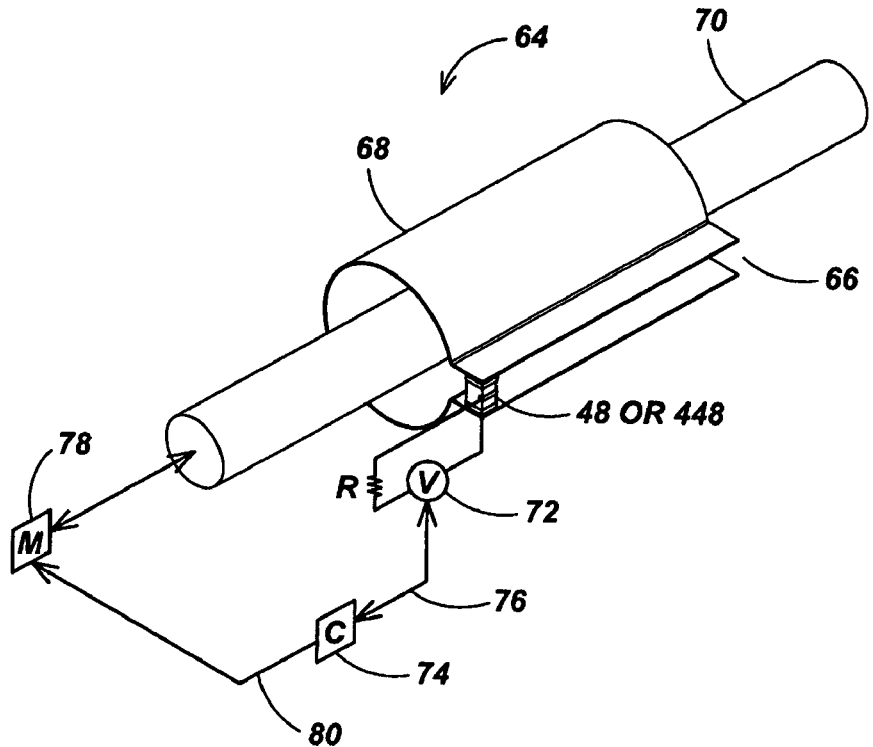
FIG. 5A is a perspective view of a cylinder resonator embodiment of this invention including the MLCC of FIG. 4B or 4C.

FIG. 5A is a perspective view of a cylinder resonator 64 of this invention including three-terminal MLCC capacitor 448 (FIG. 4C) coupled across a longitudinal slot 66 in a conductive cylinder wall 68 within which is moveably disposed a ferromagnetic core 70. Preferably, a voltage supply 72 is coupled as necessary to provide a voltage bias across one-half of center-tapped MLCC capacitor 448 to adjust the net resonator capacitance value C for resonator tuning purposes in accordance with commands received from a controller 74 on the bus 76. Voltage supply 72 may also include a conductively-coupled excitation generator for creating current in cylinder resonator 64 at the primary resonant frequency $f_R$, provided that a small bypass capacitor (not shown) is included at isolation resistor R. Alternatively, ferromagnetic core 70 may be longitudinally repositioned by the motor 78 to adjust the resonator inductance value L for resonator tuning purposes in accordance with commands received from controller 74 on the bus 80. Controller 74 includes means for sensing resonant frequency errors and for producing correction signals that are described below with reference to FIGS. 13-15, for example. Cylinder resonator 64 may alternatively employ three-terminal MLCC capacitor 48 (FIG. 4B) instead of MLCC capacitor 448 with similar utility.

Figure 5B:
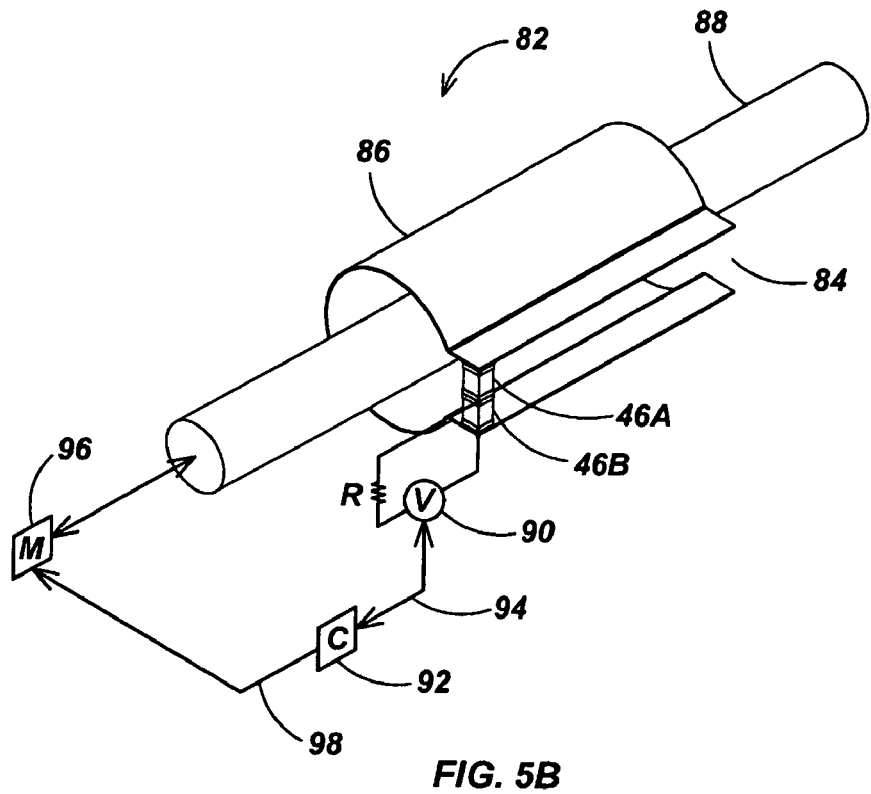
FIG. 5B is a perspective view of a cylinder resonator embodiment of this invention including the MLCC of FIG. 4A.

Similarly, FIG. 5B is a perspective view of a cylinder resonator 82 of this invention including two series-coupled two-terminal MLCC capacitors 46A-B (FIG. 4A) coupled across a longitudinal slot 84 in a conductive cylinder wall 86 within which is moveably disposed a ferromagnetic core 88. Preferably, a voltage supply 90 is coupled as necessary to provide a voltage bias across MLCC capacitors 46A and 46B to adjust the net resonator capacitance value C for resonator tuning purposes in accordance with commands received from a controller 92 on the bus 94. Voltage supply 90 may also include a conductively-coupled excitation generator for creating current in cylinder resonator 82 at the primary resonant frequency $f_R$, provided that a small bypass capacitor (not shown) is included at isolation resistor R. Alternatively, ferromagnetic core 80 may be longitudinally repositioned by the motor 96 to adjust the resonator inductance value L for resonator tuning purposes in accordance with commands received from controller 92 on the bus 98. Controller 92 includes means for sensing resonant frequency errors and for producing correction signals that are described below with reference to FIGS. 13-15, for example.

Note that cylinder resonators 64 and 82 each use a ferromagnetic core (70 and 88) of higher permeability than air inside the conductive cylinder wall (68 and 86) to increase the resonator inductance value L, thereby reducing the diameter of conductive cylinder wall (68 and 86) and thereby the resonator size necessary for achieving a predetermined resonant frequency value $f_R$. The inventors have found that the single-turn geometry (exemplified by cylinder resonators 64 and 82) using a conductive tube with a longitudinal slit appears to optimize the wire form-factor requirements for the man-portable resonator of this invention. The capacitor elements may be physically (as well as conductively) mounted across the longitudinal slit in the conductive tube, either directly or on a suitable carrier such as, for example, a PCB substrate (not shown). Cylinder resonator 64 can also be advantageously used with capacitor 46, where active tuning is not required or limited by space requirements.

Figure 6A:
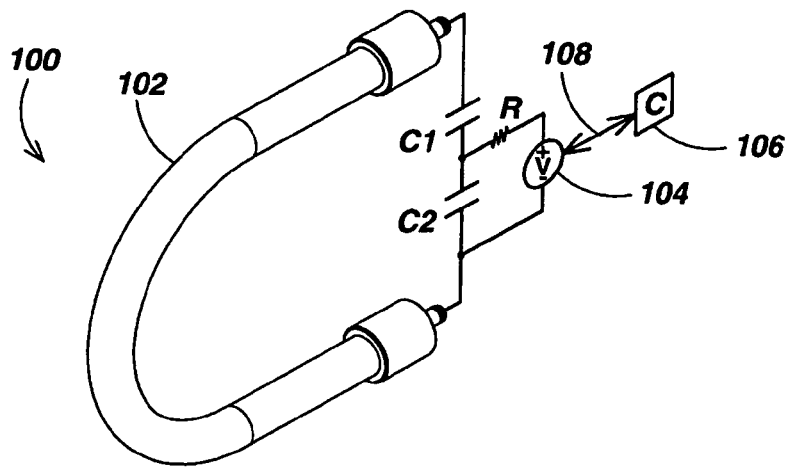
FIG. 6A is a perspective view of an alternative ring resonator embodiment of this invention including a single conductive loop of litzendraht wire.

FIG. 6A is a perspective view of a ring resonator embodiment 100 of this invention including a single conductive litzendraht wire ("Litz wire") loop 102, which is known in the art to be a multistrand configuration that minimizes the power losses otherwise encountered in a solid conductor due to the "skin effect," or the tendency of radio frequency current to be concentrated at the surface of the conductor. The two ends of Litz wire loop 102 are coupled conductively to the two piezoelectric MLCC capacitors C1 and C2 substantially as shown. In accordance with the teachings of this invention, a voltage supply 104 is coupled to apply a voltage bias across MLCC capacitor C2 responsive to commands from the tuning controller 106 received on the bus 108. Voltage supply 104 may also include a conductively-coupled excitation generator for creating current in ring resonator 100 at the primary resonant frequency $f_R$, provided that a small bypass capacitor (not shown) is included at isolation resistor R. Controller 106 employs certain resonance information (received, for example, on bus 108) to generate the necessary resonator tuning corrections as may be better appreciated with reference to the discussion of FIGS. 13-15 below, for example.

Figure 6B:
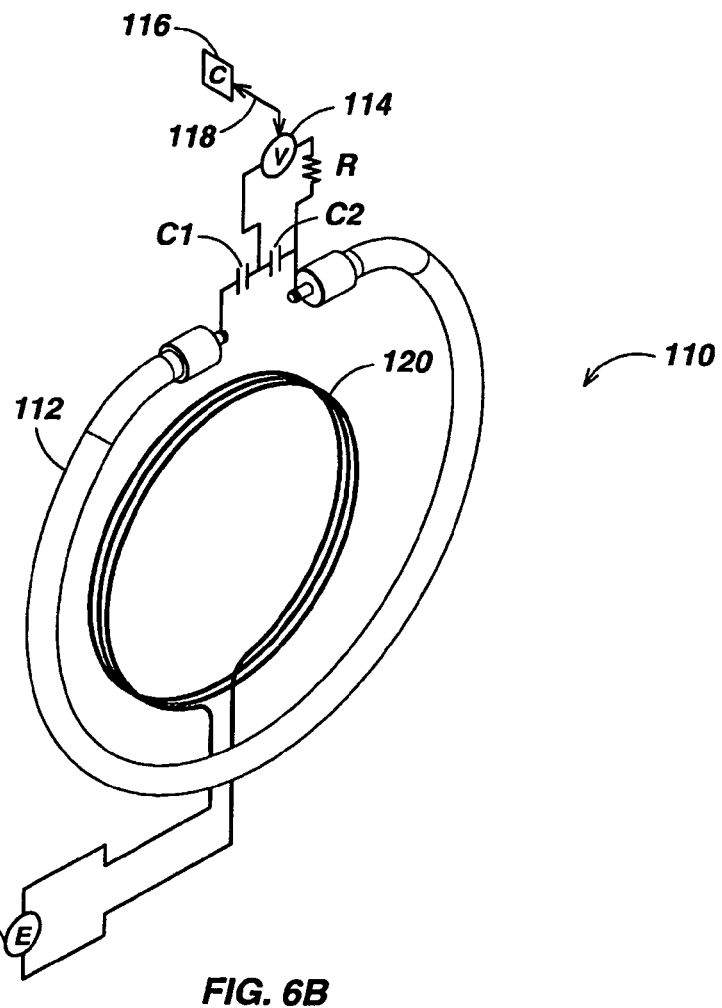
FIG. 6B is a perspective view of the ring resonator embodiment of FIG. 6A employing a nonconductive coupling technique between the electrical resonator and the electrical power source.

FIG. 6B is a perspective view of a ring resonator embodiment 110 of this invention including a single conductive loop 112 coupled conductively to the two piezoelectric MLCC capacitors C1 and C2 substantially as shown. A separate bias voltage supply 114 applies a bias voltage across MLCC capacitors C1 and C2 responsive to commands from the tuning controller 116 received on the bus 118. The adjacent excitation coils 120 are energized by a separate excitation generator 122 to produce an electromagnetic field that is nonconductively coupled to conductive loop 112 to generate current therein at the primary resonant frequency $f_R$.

Figure 7A:
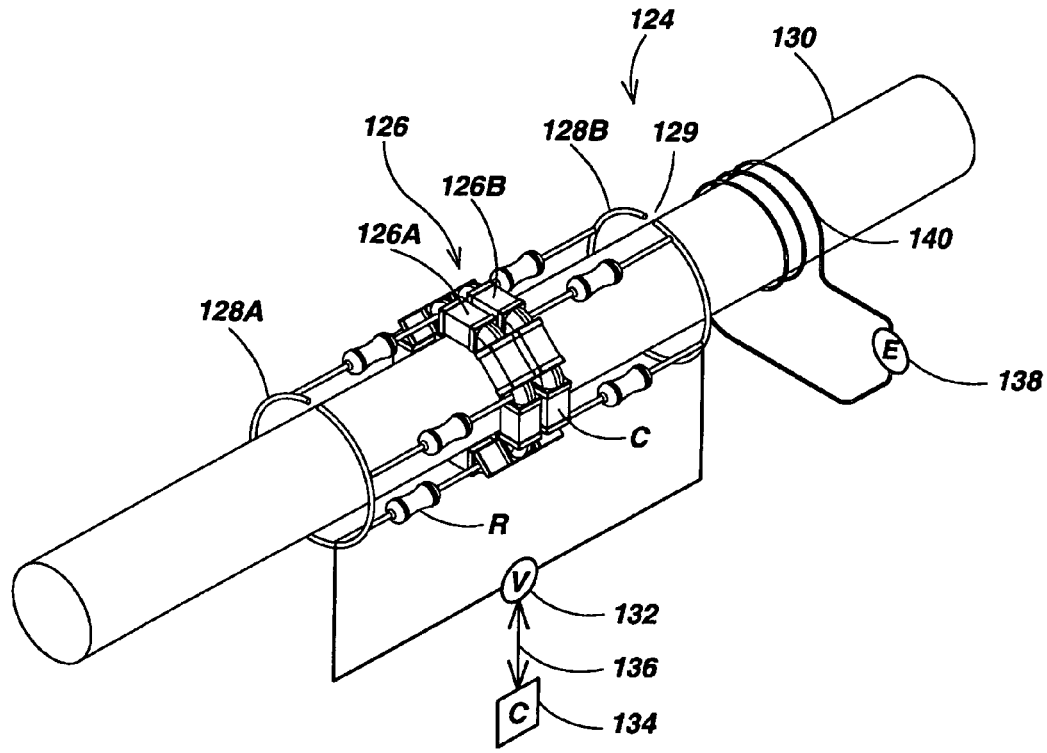
FIG. 7A is a perspective view of an alternative resonator embodiment of this invention employing a low-ESR capacitor ring and the nonconductive coupling technique of FIG. 6B.
Figure 7B:
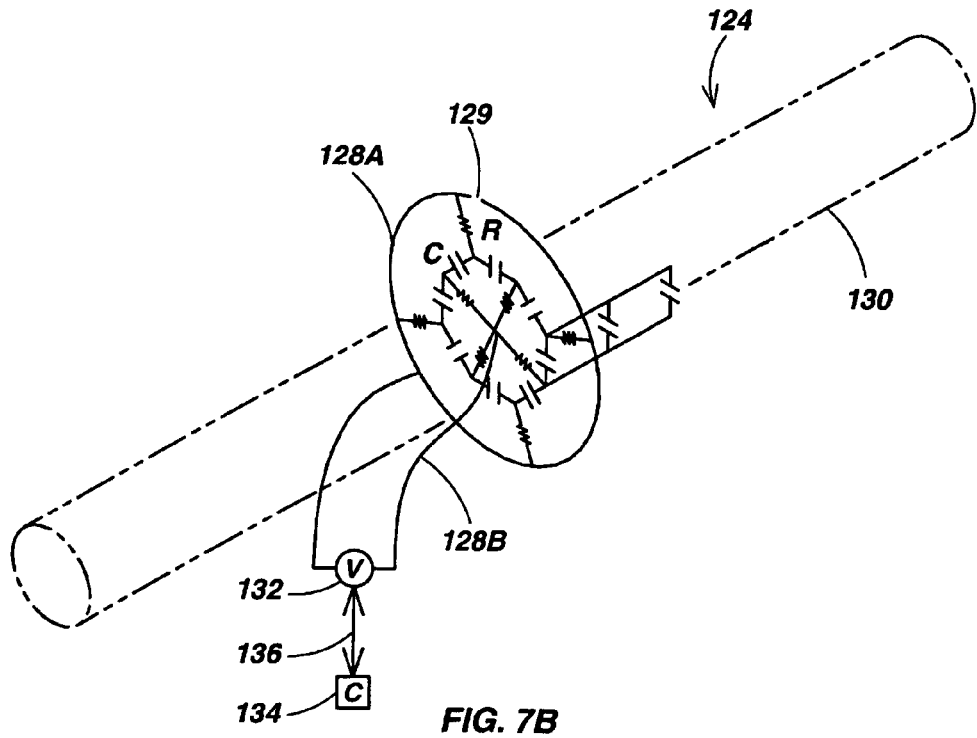
FIG. 7B is a schematic diagram illustrating the equivalent circuit of the resonator embodiment of FIG. 7A.

FIG. 7A is a perspective view of a resonator embodiment 124 of this invention employing a capacitor embodiment 126 consisting of a plurality of capacitor rings 126A-B and a conductive inductor embodiment 128 consisting of the thick conductors in capacitor rings 126A-B and a plurality of wire rings 128A-B. To prevent current flow and power loss within the relatively slight wire rings 128A-B, a gap exemplified by the gap 129 is disposed in each. Capacitor ring 126A, for example, includes a plurality of MLCC capacitors C, substantially as shown in the schematic diagram of FIG. 7B. A ferromagnetic core 130 is disposed to increase the resonator inductance value L and the separate bias voltage supply 132 is connected with a plurality of isolation resistors R as necessary to apply a bias voltage across the MLCC capacitors C responsive to commands received from the tuning controller 134 on the bus 136. A separate excitation generator 138 energizes the adjacent excitation coils 140 to produce an electromagnetic field that is nonconductively coupled to resonator 124 through ferromagnetic core 130 to generate resonator current at the primary resonant frequency $f_R$. Resonator 124 has a convenient packing factor and should be useful.

Figure 8:
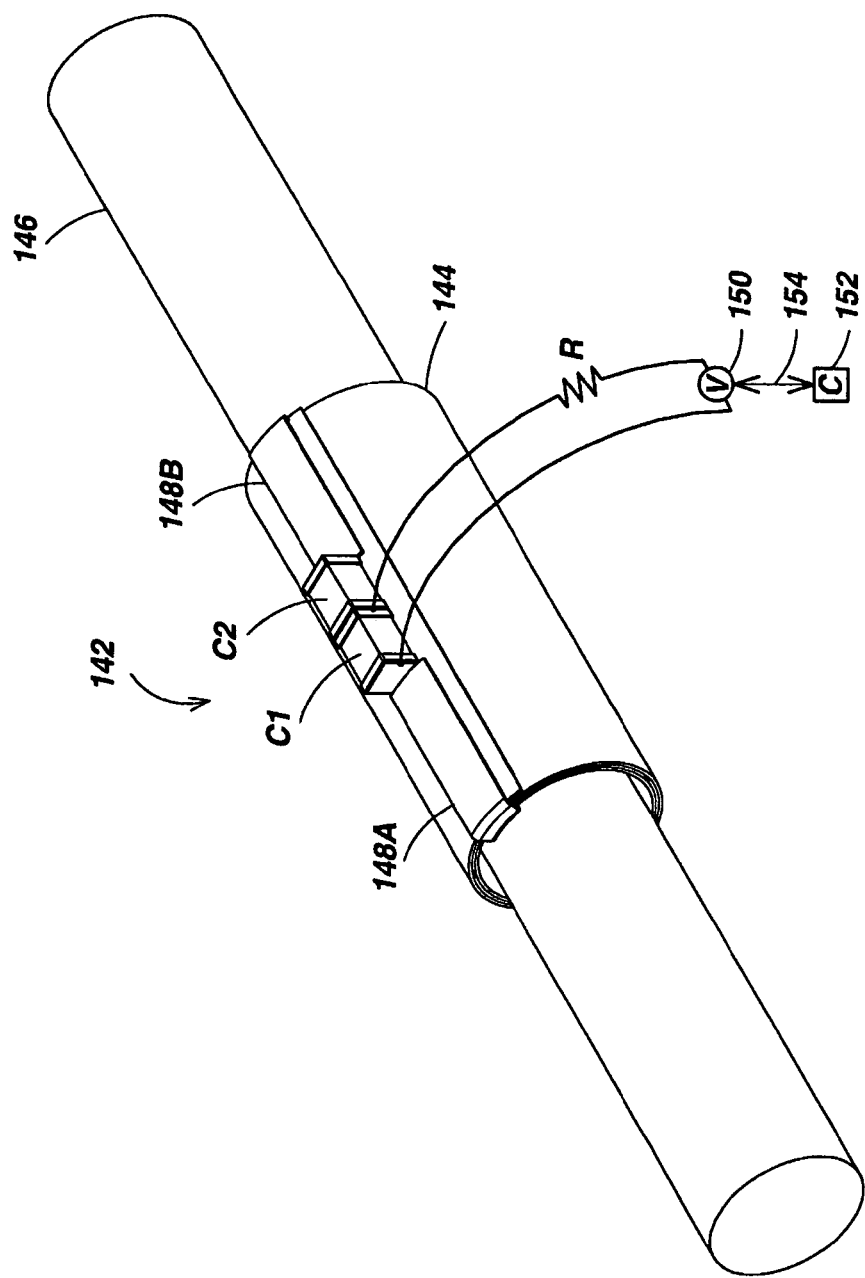
FIG. 8 is a perspective view of an alternative cylinder resonator embodiment of this invention adapted for low-frequency operation by means of a multi-turn conductive layer.

FIG. 8 is a perspective view of a cylinder resonator embodiment 142 of this invention adapted for low-frequency operation by means of a multi-turn conductive layer 144 disposed around a ferromagnetic core 146 to provide a very high resonator inductance value L. The two MLCC capacitors C1 and C2 (either of which may include a plurality of physical capacitor chips) are coupled to alternate ends of conductive layer 144 by means of the two flat conductors 148A-B substantially as shown. Preferably, a voltage supply 150 is coupled as necessary to provide a voltage bias across MLCC capacitors C1 and C2 to adjust the net resonator capacitance value C=C1C2/(C1+C2) for resonator tuning purposes in accordance with commands received from a tuning controller 152 on the bus 154. Voltage supply 150 may also include an excitation generator for creating current in cylinder resonator 142 at the primary resonant frequency $f_R$, provided that a small bypass capacitor (not shown) is included at isolation resistor R. Tuning controller 152 includes means for sensing resonant frequency errors and for producing correction signals that are described below with reference to FIGS. 13-15, for example.

Figure 9:
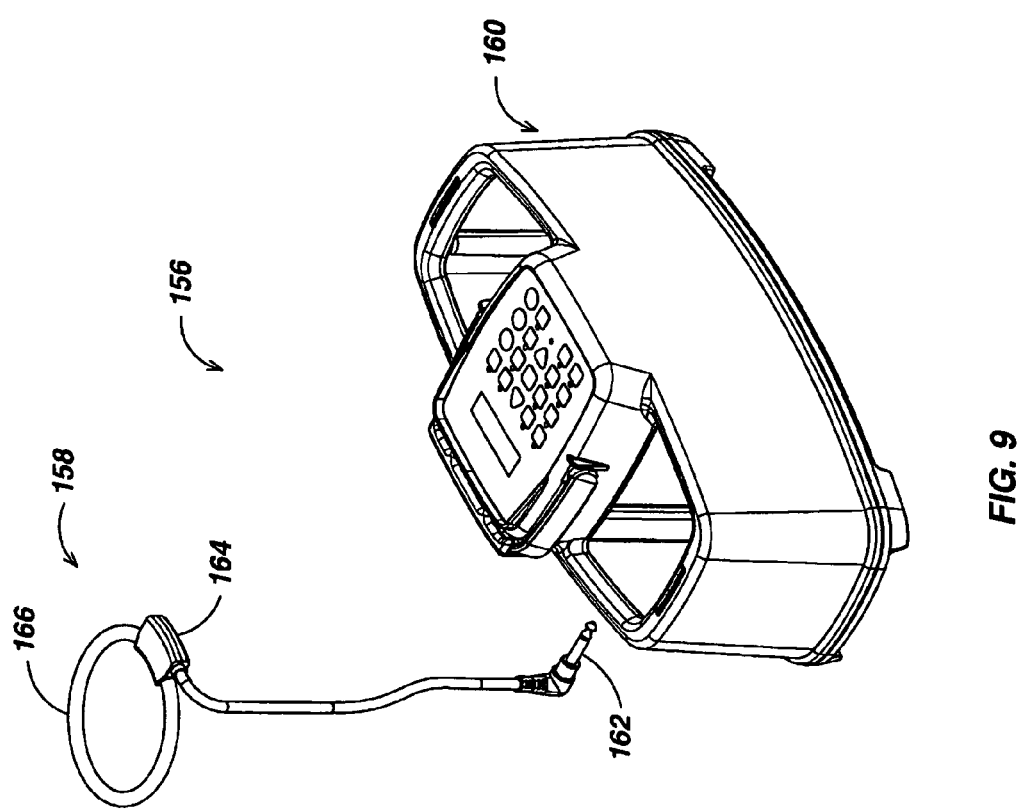
FIG. 9 is a perspective view of a transmitter apparatus of this invention employing a ring resonator embodiment of this invention adapted for coupling and operation with an exemplary standard line transmitter.

FIG. 9 is a perspective view of a transmitter apparatus 156 of this invention employing a ring resonator embodiment 158 of this invention adapted for coupling and operation with an exemplary standard line transmitter 160 such as, for example, any useful line transmitter described in the above-cited commonly-assigned patent applications. Ring resonator 158 includes an electrical plug 162 adapted for insertion into a mating receptacle (not shown) in line transmitter 160 for coupling to an electrical power source such as a battery power supply (not shown) and an external excitation generator (not shown) internal to line transmitter 160. A tuning module 164 and a loop conductor 166 may be seen in FIG. 9 but the other necessary elements of ring resonator 158, such as the MLCC capacitor plurality (not shown) and the tuning controller (not shown) are disposed within tuning module 164 and hidden from view. Operation of ring resonator 158 may be readily appreciated with reference to the discussion of, for example, FIG. 2 or FIGS. 6A-B above. Ring resonator 158 may optionally include a supporting stand (not shown) that is used to position and support the ring resonator in a vertical orientation. This configuration allows the ring to be placed directly above a target buried utility for optimal signal induction. In this usage, the plane of the ring would be aligned with the buried conductor. A horizontally oriented ring must be placed slightly to one side to induce a signal in a buried conductor.

The inventors found that a considerable gain in both efficiency and induced output power can be achieved through using resonator 158 with line transmitter 160. The inventors have measured induced signal strength increases of up to 20 times (13 dB) with very little increase in line transmitter power consumption when using resonator 158 over the prior art with transmitter apparatus 156 (FIG. 9). This measured improvement is not considered by the inventors to be the upper limit available from the resonator of this invention.

Figure 10:
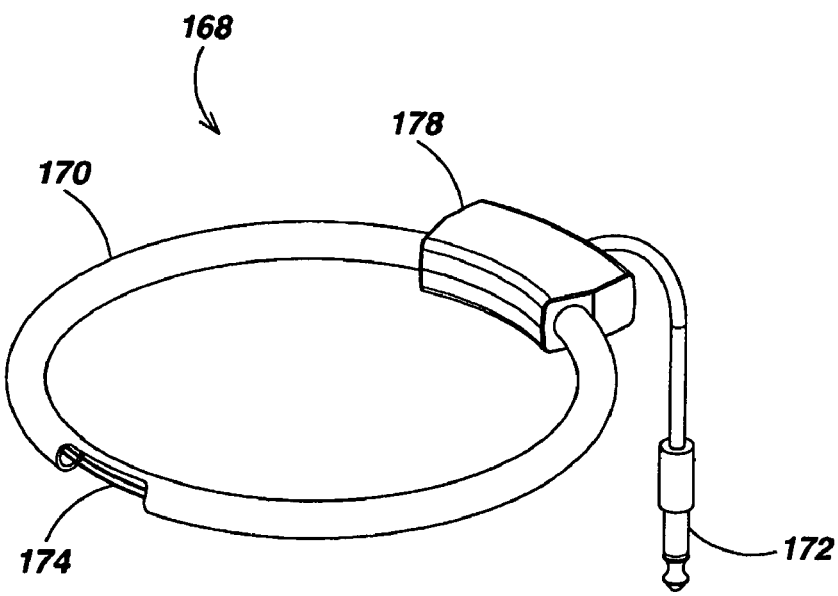
FIG. 10, including detail
Figure 10A:
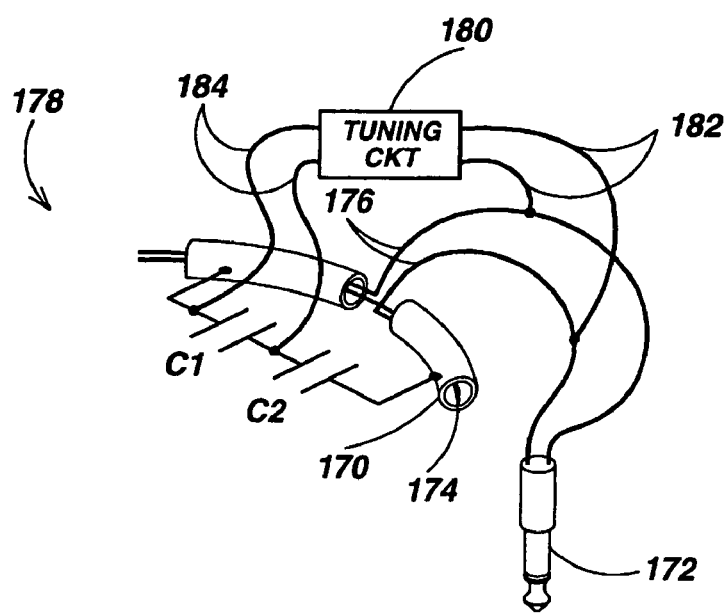
FIG. 10A, is a schematic cutaway perspective view of a ring resonator embodiment of this invention suitable for use with the transmitter apparatus of FIG. 9 and employing a hollow tube conductor with an internal excitation coil.

FIG. 10 is a schematic cutaway perspective view of a ring resonator embodiment 168 of this invention suitable for use with transmitter apparatus 156 (FIG. 9). Ring resonator 168 includes a hollow tube conductor 170 and an electrical plug 172 adapted for insertion into a mating receptacle (not shown) in a line transmitter (such as line transmitter 160 in FIG. 9) for coupling to an external electrical power source such as a battery power supply (not shown) and an external excitation generator (not shown). The internal excitation coil 174 is energized by the conductor pair 176 (FIG. 10A) coupling from an external excitation generator (not shown) to produce an electromagnetic field that is nonconductively coupled to ring resonator 168 to generate current therein at the primary resonant frequency $f_R$, which is tuned to a selectable one of a set of predetermined frequency values $\{f_{R1}\}$ by the tuning module 178. FIG. 10A illustrates some of the internal detail of tuning module 178, including the MLCC capacitors C1 and C2 (either of which may include a plurality of physical capacitor chips) and the tuning circuit 180, which accepts resonance information from the conductor pair 182 and delivers a bias voltage to MLCC capacitors C1 and C2 on the conductor pair 184, thereby changing the net capacitance value C of ring resonator 168 to bring the primary resonant frequency $f_R = f_{R1}$. Tuning circuit 180 includes a tuning controller (not shown) and a bias voltage supply (not shown). The turns ratio of internal excitation coil 174 to hollow tube conductor 170 may be adjusted to match the impedance of ring resonator 168 near resonance to the output impedance of the external excitation generator (not shown) to improve excitation coupling.

The inventors have found that the coupling efficiency of the excitation generator (not shown) to resonator 168 can be accomplished merely by using the generator in its inductive excitation mode and properly disposing the tuned resonator around the generator. The performance of this arrangement is almost as high as that seen by connecting the resonator through electrical plug 172 directly to the excitation generator. A significant increase in convenience is seen from using the cabled connection since this allows placement of the resonator and its orientation concealed conductors without regard to the placement of the excitation generator.

The inventors have also found that optimal nonconductive coupling of an external excitation generator to the resonator depends on both the Q of the resonator and the Q of the excitation generator output circuit such that differences in Q between resonator and output circuit tend to require reduced coupling efficiency. Improved inductive coupling tends to increase the resonant frequency of the excited resonator such that a downward retuning is required with improved nonconductive coupling to an external excitation generator. The inventors have also found that improved capacitive coupling tends to decrease the resonant frequency of the resonator system, whereas capacitive coupling with a capacitor and an inductor in series, i.e., with a series resonant circuit leads to two resonances which repel each other in frequency as the coupling increases. Also, the optimal excitation coupling required for maximum efficiency is less than needed for maximum excitation generator resonator output current for a fixed supply voltage. Because strong coupling may be undesirable, the conductive coupling technique of this invention incorporates means for controlling coupling to optimize efficiency.

Figure 11:
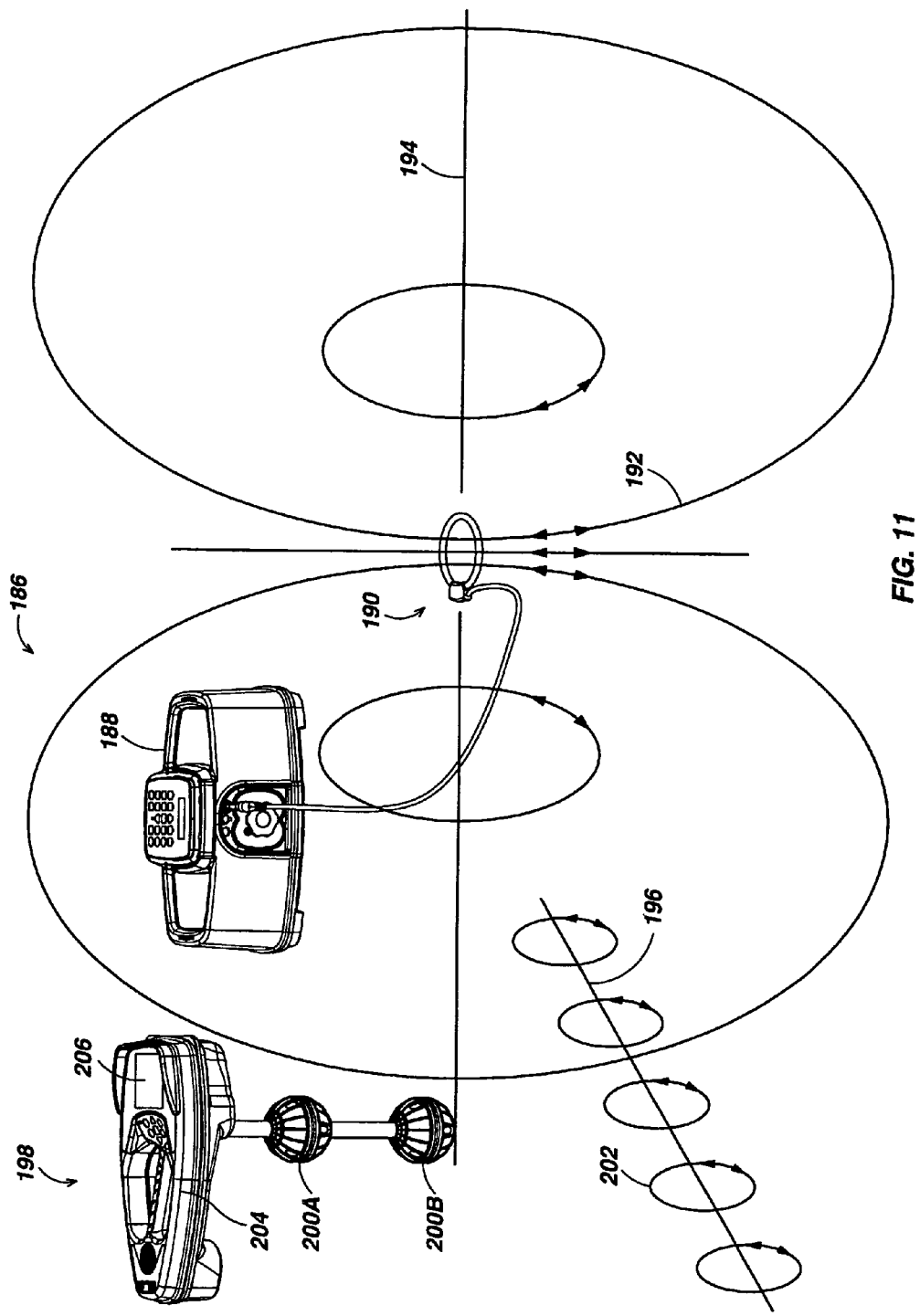
FIG. 11 is a schematic diagram illustrating an exemplary embodiment of the human-portable locator system of this invention.

FIG. 11 is a schematic diagram illustrating a human-portable locator system embodiment 186 of this invention, including a line transmitter 188 coupled to a ring resonator 190 to produce the magnetic field flux lines exemplified by the flux line 192, which is seen to penetrate below the ground level 194 to couple to the buried utility line 196 and to generate an alternating current therein. Locator system 186 also includes the human-portable locator receiver 198, which includes an upper sensor array 200A and a lower sensor array 200B each for producing a plurality of sensor signals responsive to the electromagnetic field emission 202 arising from the alternating current in buried utility line 196. Locator receiver 198 includes a processor 204 for producing location data signals representing a location of electromagnetic field emission 184 with respect to arrays 200A-B and a user interface 206 for reporting to a user a location for buried conductor 196. Locator receiver 198 may be embodied as any useful locator receiver described in the above-cited commonly-assigned patent applications, for example.

Figure 12:
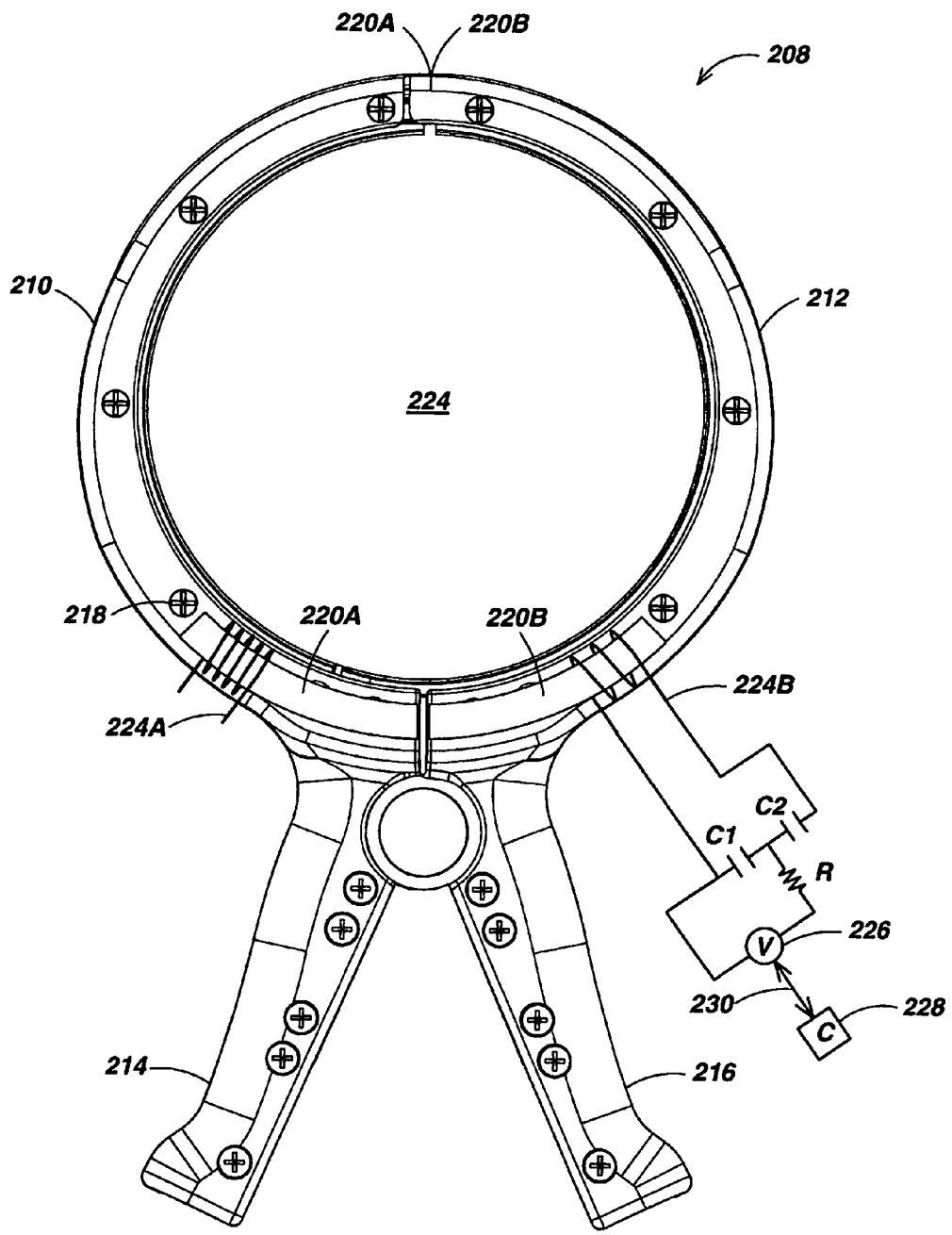
FIG. 12 is a front view of an alternative ring resonator embodiment of this invention adapted for use as an inductive clamp.

FIG. 12 is a front view of an inductive clamp embodiment 208 incorporating the resonator of this invention. Inductive clamp 208 allows a user to apply a signal to a buried conductor by directly clamping to an accessible above-ground segment of a buried conductor (not shown) when a conductive connection is impractical. Inductive clamp 208 has a pair of C-shaped jaws 210 and 212, each connected to a corresponding handle 214 and 216, respectively. Handles 214-216 may be gripped to open jaws 210-212 by overcoming the force of a leaf spring assembly (not shown). Each jaw and handle element, such as jaw 210 and handle 214, may be made of integrally molded plastic halves held together by screws exemplified by the screw 218. Each jaw 210-212 holds a semi-circular ferromagnetic core 220A-B (only partially visible in cutaway) made of laminated layers of a ferromagnetic material, such as that sold under the trademark Superperm 80™, the layers being separated by suitable insulation material to reduce eddy current losses and improve resonator Q. It is important that the opposing flat ends 222A-B (only partially visible) of ferromagnetic cores 220A-B butt up against each other without leaving a significant air gap when jaws 210-212 are closed to minimize flux leakage across the air gap therebetween and thereby provide the maximal signal induction into the buried conductor passing through the region between jaws 210-212. An air gap of one thousandth of an inch, for example, can result in a fifty-percent reduction in induced signal strength.

Each ferromagnetic core 220A-B is disposed within a conductive coil 224A-B, each of which may be coupled to the other in series or parallel (not shown) to provide the desired resonator inductance value L. Coils 224A-B are coupled to the two MLCC capacitors C1 and C2 (either of which may include a plurality of physical capacitor chips) and a voltage supply 226 is coupled as necessary to provide a voltage bias across MLCC capacitors C1 and C2 to adjust the net resonator capacitance value C=C1C2/(C1+C2) for resonator tuning purposes in accordance with commands received from a controller 228 on the bus 230. Voltage supply 226 may also include an excitation generator for creating resonator current in coils 224A-B at the primary resonant frequency $f_R$, provided that a small bypass capacitor (not shown) is included at isolation resistor R.

Figure 13:
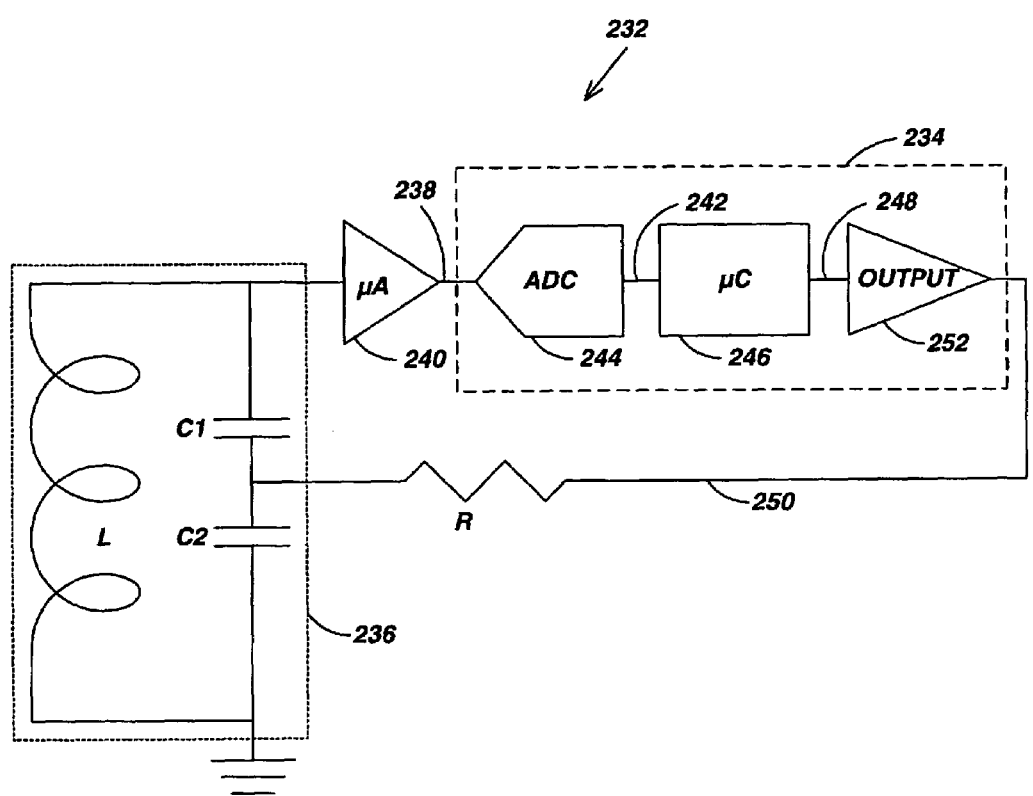
FIG. 13 is a schematic diagram illustrating an exemplary resonator tuning controller embodiment of this invention employing a peak voltage sensing microprocessor circuit.

FIG. 13 is a schematic diagram illustrating a resonator embodiment 232 of this invention employing a peak voltage sensing tuning controller 234 coupled to an LC tank circuit 236. The sample-and-hold amplifier 240 accepts an analog voltage from LC tank circuit 236 and produces a peak analog voltage sample 238, which is accepted by tuning controller 234 for use in producing a digital signal 242 at the output of an analog-to-digital converter (ADC) 244 representing the peak analog voltage sample 238. The microprocessor 246 accepts digital signal 242 and produces a second digital signal 248 representing the MLCC capacitor bias voltage 250 necessary for tuning the actual resonant frequency $f_R$ of resonator 232 to a predetermined resonant frequency value $f_{R1}$. Digital signal 248 is converted to an analog voltage and amplified in the amplifier 252 to produce MLCC capacitor bias voltage 250, which is applied through an isolation resistor R to the MLCC capacitors C1 and C2 in LC tank circuit 236. Microprocessor 246 includes means for storing procedures and data representing the relationship of the net capacitance of MLCC capacitors C1 and C2 to applied voltage, for example.

Figure 14:
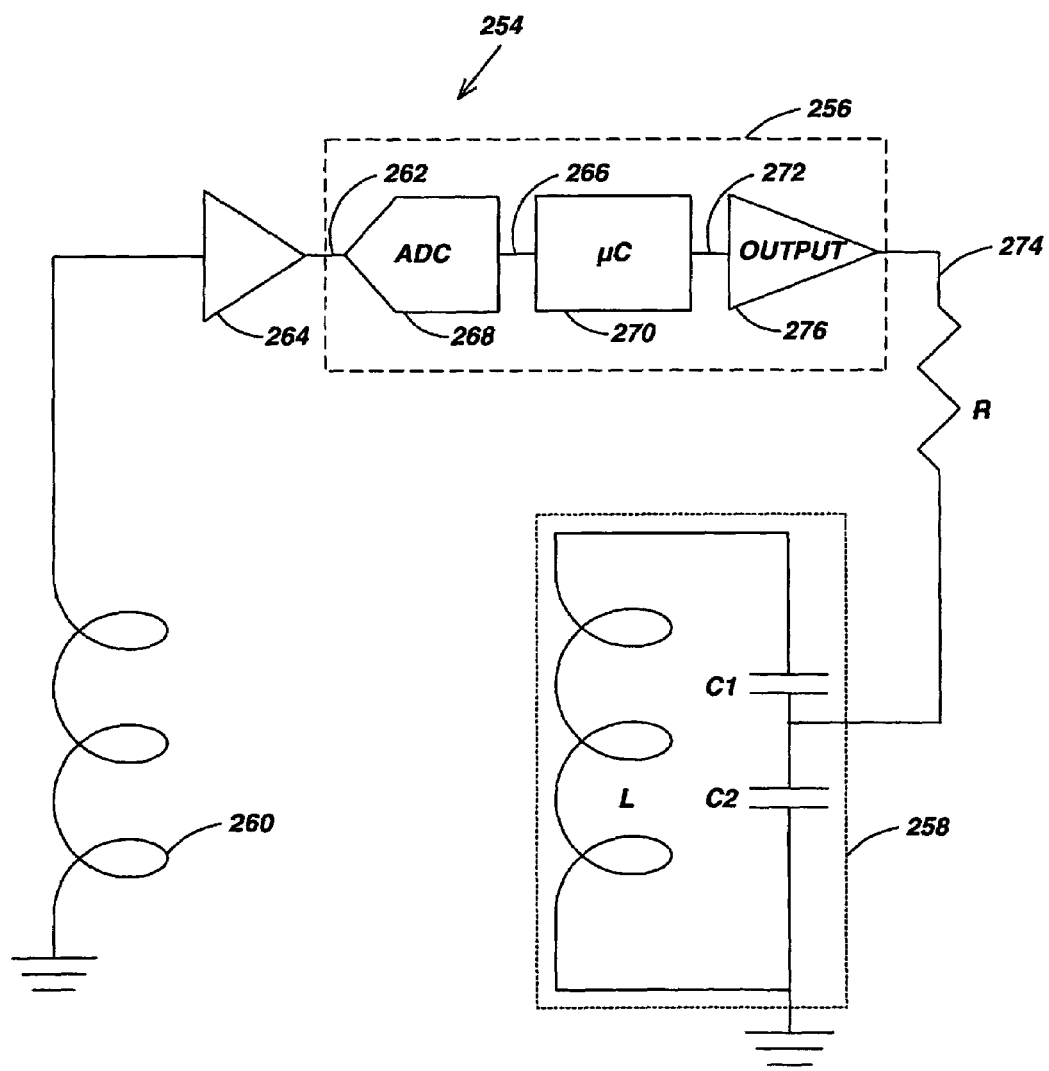
FIG. 14 is a schematic diagram illustrating an alternative embodiment of the resonator tuning controller of FIG. 13 having a separate sense winding.

FIG. 14 is a schematic diagram illustrating a resonator embodiment 254 of this invention employing a peak voltage sensing tuning controller 256 coupled to an LC tank circuit 258 by means of an isolated sense winding 260. The sample-and-hold amplifier 264 accepts an analog voltage from isolated sense winding 260 (representing the flux generated by current flowing in LC tank circuit 258) and produces a peak analog voltage sample 262, which is accepted by tuning controller 256 for use in producing a digital signal 266 at the output of an ADC 268 representing the peak analog voltage sample 262. The microprocessor 270 accepts digital signal 266 and produces a second digital signal 272 representing the MLCC capacitor bias voltage 274 necessary for tuning the actual resonant frequency $f_R$ of resonator 254 to a predetermined resonant frequency value $f_{R1}$. Digital signal 272 is converted to an analog voltage and amplified in the amplifier 276 to produce MLCC capacitor bias voltage 274, which is applied through an isolation resistor R to the MLCC capacitors C1 and C2 in LC tank circuit 258. Microprocessor 270 includes means for storing procedures and data representing the relationship of the net capacitance of MLCC capacitors C1 and C2 to applied voltage, for example.

Figure 15:
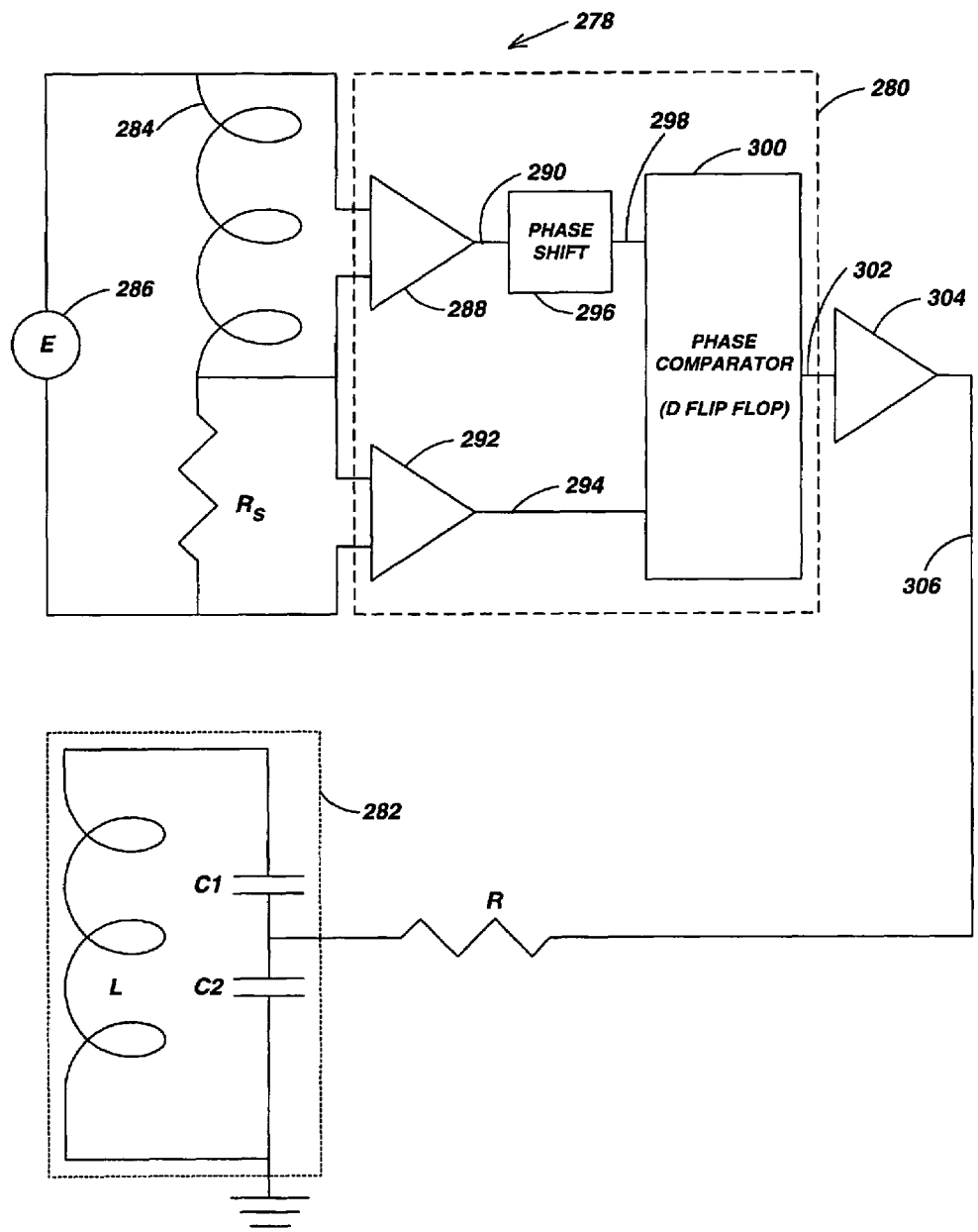
FIG. 15 is a schematic diagram illustrating an alternative resonator tuning controller embodiment of this invention employing a drive impedance phase sensing microprocessor circuit.

FIG. 15 is a schematic diagram illustrating a resonator embodiment 278 of this invention employing a drive impedance phase sensing tuning controller 280. Resonator 278 includes an LC tank circuit 282 that is indirectly excited by means of the exciter coil 284 (such as illustrated in FIGS. 6B and 10, for example), which is powered by a separate excitation generator 286 and includes a series sense resistor $R_S$ substantially as shown. The isolation amplifier 288 accepts the analog voltage drop across exciter coil 284 to produce an analog signal 290 representing the excitation generator output voltage. The isolation amplifier 292 accepts the analog voltage drop across sense resister $R_S$ to produce an analog signal 294 representing the excitation generator output current. Having both excitation voltage signal 290 and excitation current signal 294 provides sufficient information to infer the load impedance seen by excitation generator 286, which is minimized at zero phase when LC tank circuit 282 is tuned to resonate at the output frequency of excitation generator 286. The phase shifter 296 adjusts the phase of excitation voltage signal 290 to produce a phase-shifted voltage signal 298 that compensates for stray circuit phase shifts as needed to achieve a predetermined resonant frequency value $f_{R1}$. The phase comparator 300 accepts current signal 294 and phase-shifted voltage signal 298 to produce an output signal 302 representing the phase of the load impedance presented by LC tank circuit 282. The isolation amplifier 304 accepts output signal 302 and produces a bias voltage 306 for application to the MLCC capacitors C1 and C2, thereby changing the net capacitance value C of resonator 278 to bring the primary resonant frequency $f_R = f_{R1}$.

Figure 16:
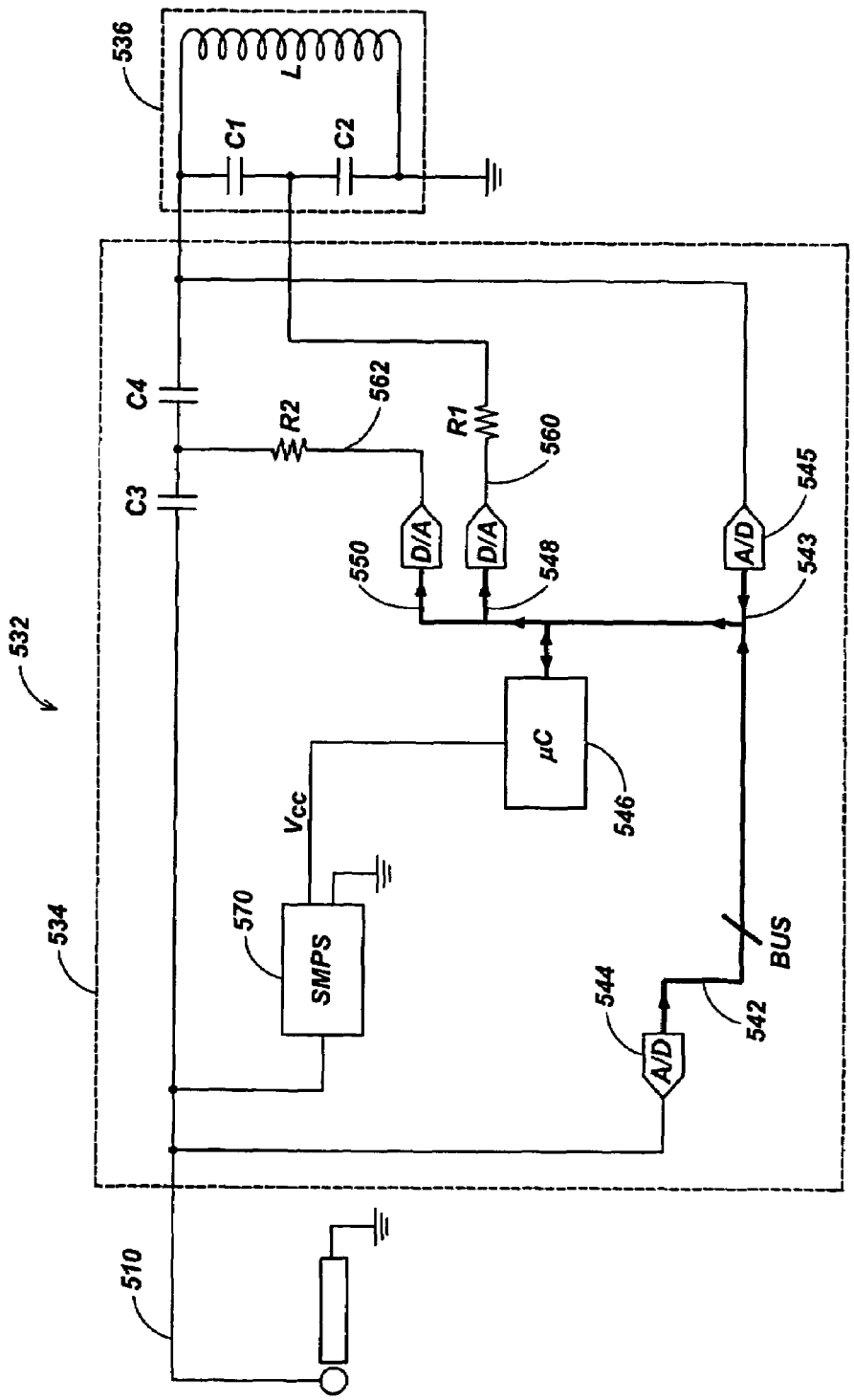
FIG. 16 is a schematic diagram illustrating an alternative dielectrically-coupled tunable resonator embodiment of this invention employing a phase and voltage sensing tuning and coupling controller.

FIG. 16 is a schematic diagram illustrating a dielectrically-coupled tunable resonator embodiment 532 of this invention employing a phase and voltage sensing controller 534 coupled to an LC tank circuit 536. A Switch Mode Power Supply (SMPS) 570 rectifies, filters, and regulates a portion of the input voltage 510 to produce the voltage $V_{CC}$ for powering the microprocessor 546. Microprocessor 546 accepts the digital signal 542 representing input voltage 510 and the digital signal 543 representing the voltage drop across tank circuit 536 from the outputs of the respective ADC 544 and ADC 545. Responsively, microprocessor 546 produces a digital signal 548 representing the analog MLCC capacitor bias voltage 560 necessary for tuning the actual resonant frequency $f_R$ of tunable resonator 532. Digital signal 548 is converted to analog MLCC capacitor bias voltage 560, which is applied through an isolation resistor R1 to the MLCC capacitors C1 and C2 in LC tank circuit 536. Microprocessor 546 also responsively produces the digital signal 550 representing another analog MLCC capacitor bias voltage 562 necessary for adjusting the degree of coupling between the electrical power source of input voltage 510 and tank circuit 536 so that the coupling coefficient k is tuned to a predetermined coupling coefficient value $k_1$, for example. Digital signal 550 is converted to analog MLCC capacitor bias voltage 562, which is applied through an isolation resistor R2 to the MLCC capacitors C3 and C4. This capability to independently adjust in real time both the coupling coefficient k from the electrical power source of input voltage 510 and the resonant frequency $f_R$ in tunable resonator 532 is advantageous and useful for optimizing the performance of tunable resonator 532 by maximizing output and/or minimizing battery power consumption for a particular desired magnetic flux output level.

Figure 17:
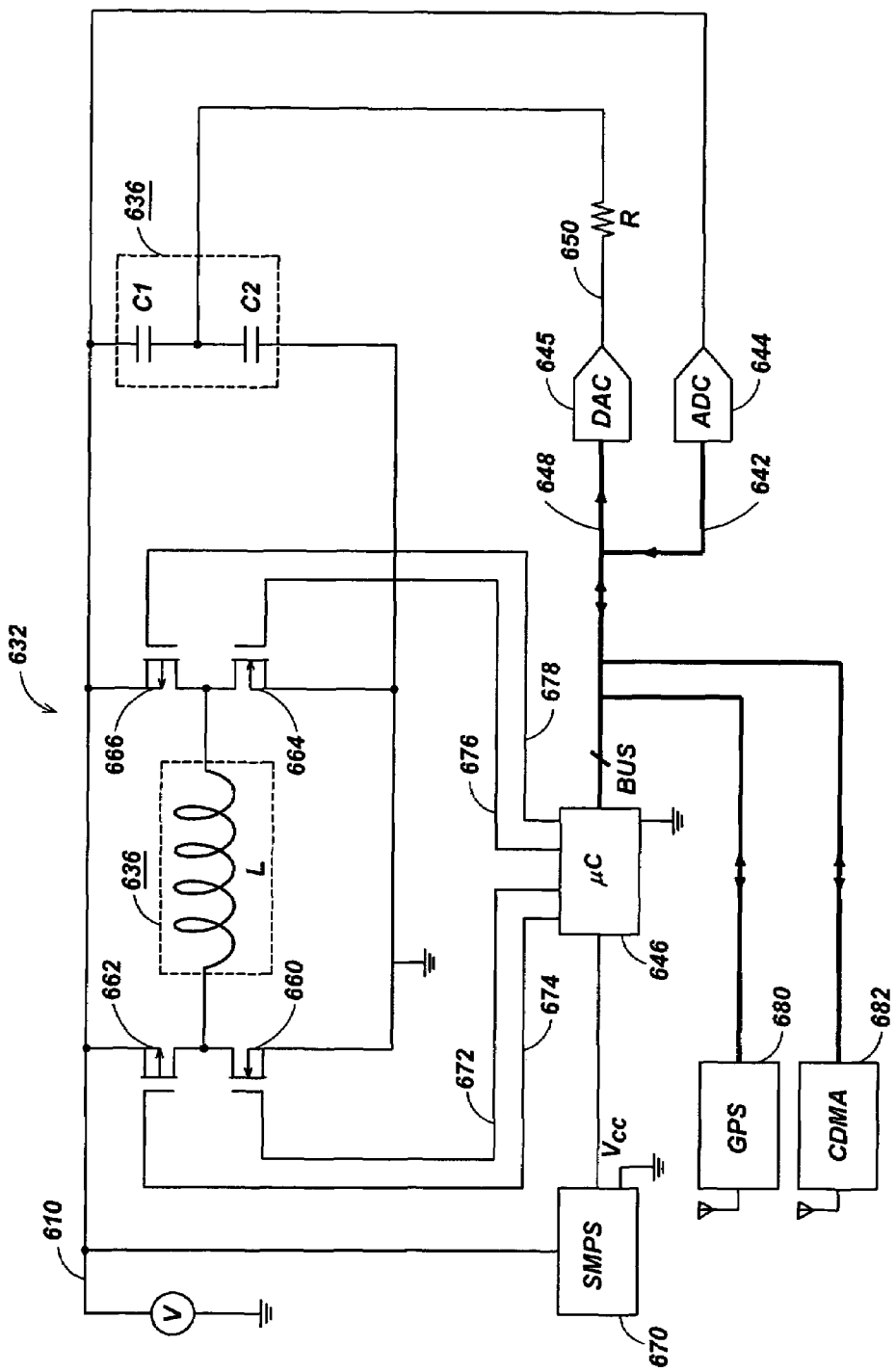
FIG. 17 is a schematic diagram illustrating an alternative tunable resonator embodiment of this invention employing a phase-modulating tuning controller.
Figure 18:
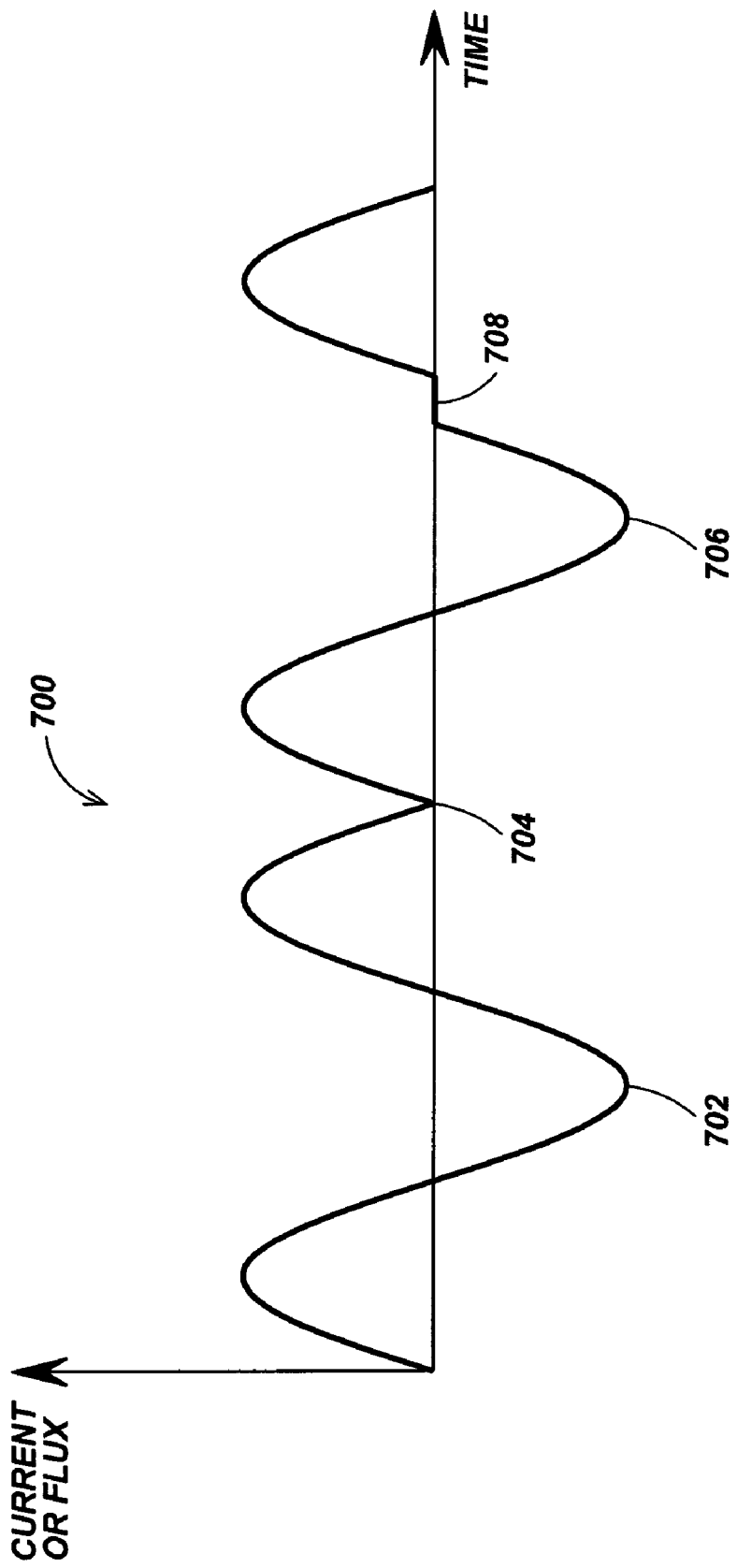
FIG. 18 is a graph illustrating the current versus time through the inductor of the resonator of FIG. 17.

FIG. 17 is a schematic diagram illustrating a phase-modulating tunable resonator embodiment 632 of this invention. The electrical power is supplied into the circuit through supply V which may itself be a power supply or a coupling network (active, passive, inductive, capacitive, diode, etc.) which allows the circuit to be driven from the output of an excitation generator. The SMPS 670 rectifies, filters, and regulates a portion of the electrical power supply input voltage 610 to produce a voltage appropriate for powering the microprocessor 646, which accepts the digital signal 642 from the output of the ADC 644 representing the voltage drop across the tank circuit 636. Microprocessor 646 adjusts a digital signal 648 representing the MLCC capacitor bias voltage 650 necessary for tuning the actual resonant frequency $f_R$ of resonator 632. Digital signal 648 is converted by the DAC 645 to an analog MLCC capacitor bias voltage 650, which is applied through an isolation resistor R to the MLCC capacitors C1 and C2 in the LC tank circuit 636. Microprocessor 646 also produces the four digital signals 672, 674, 676, and 678, which are applied to the gates of the four low-resistance power transistors 660, 662, 664, and 666. In any single quarter cycle, either the transistors 662 and 664 are simultaneously on while the transistors 660 and 666 are off, or the transistors 662 and 664 are simultaneously off while the transistors 660 and 666 are on. By switching the transistors at near zero voltage, the voltage across capacitors 636 can be continuously non-negative. If the transistors 662 and 664 are switched off and transistors 660 and 666 are switched on near a zero current point such as 704 in FIG. 18, then a phase reversal in the magnetic flux occurs. The segment 708 in FIG. 18 represents an arbitrary phase shift in the current and flux introduced by turning off all four of the transistors at zero current. By means of these signals, the magnetic flux produced by tunable resonator 632 can be modulated. A pseudorandom code can be produced by microprocessor 646 to produce a unique identifier for each such tunable resonator operating in an area. Such identifying information can be combined with external information, such as location obtained from GPS receiver 680 or CDMA receiver 682.

FIG. 18 is a graph 700 of current versus time through the inductor 636 of FIG. 17. The magnetic flux produced by this current waveform is essentially a scaled version of this waveform. Peaks 702 and 706 are exemplary current (and flux) maxima. Point 704 is a zero current point.

Figure 19:
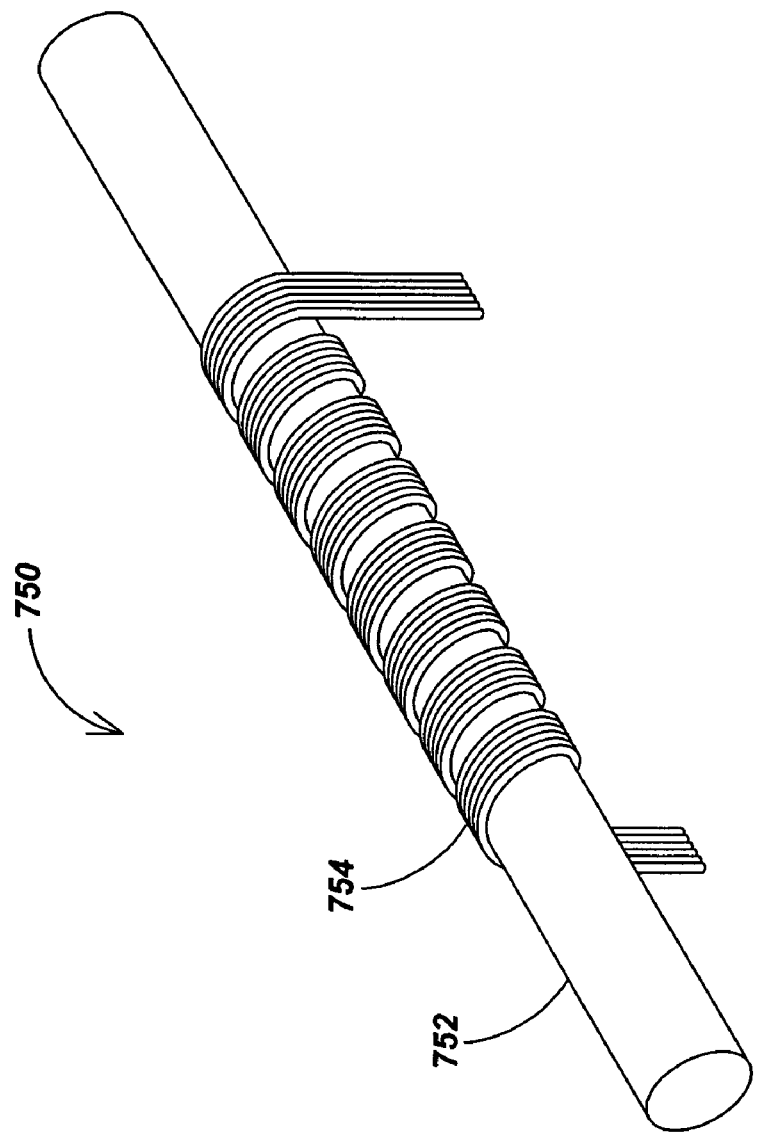
FIG. 19 illustrates a multifilar wound core.

FIG. 19 illustrates a multifilar wound core 750 with core 752 and multifilar windings 754. The multifilar windings permit very low AC and DC winding resistance.

Figure 20:
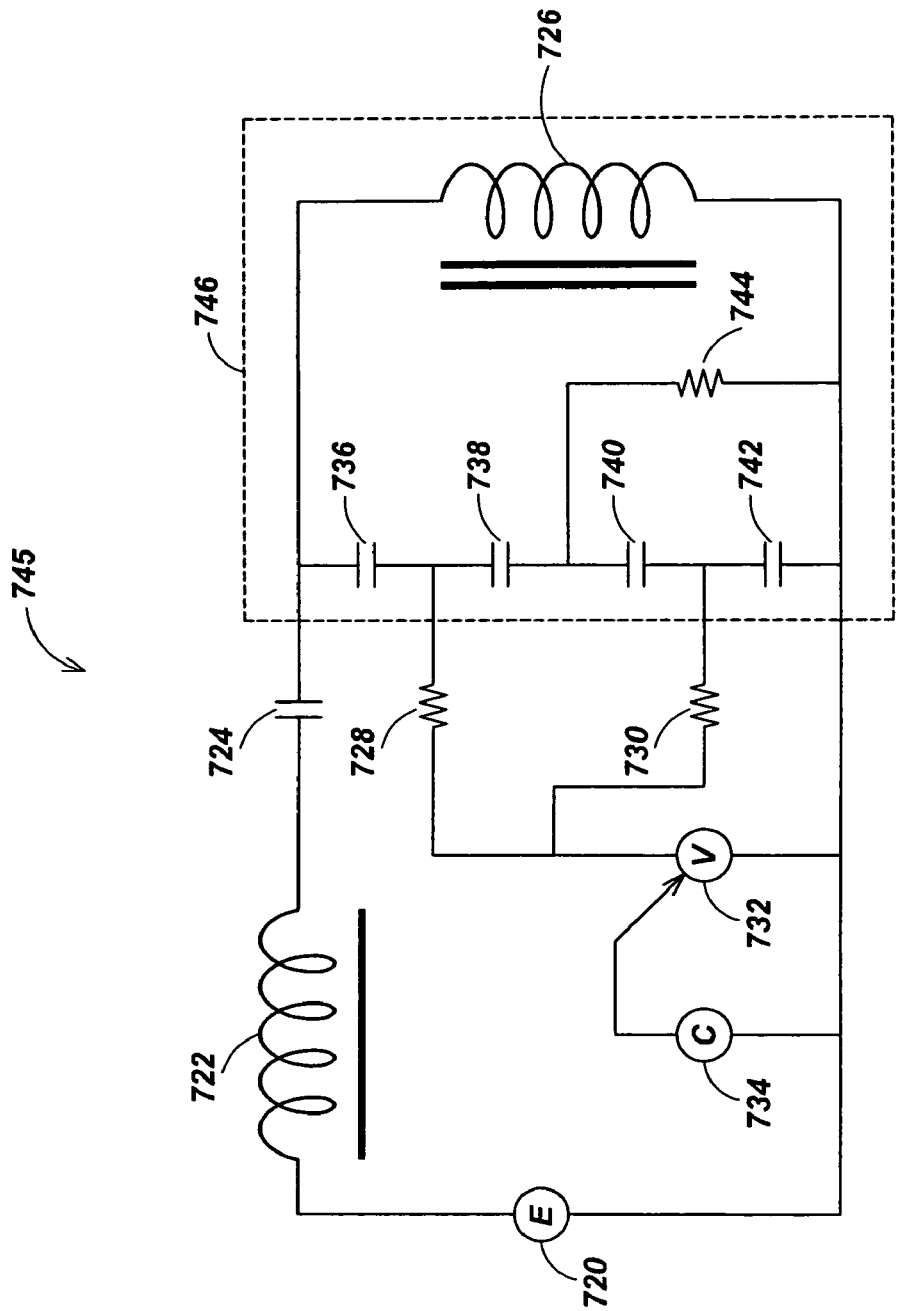
FIG. 20 is a schematic diagram illustrating a tunable resonator including a multifilar wound core.

FIG. 20 is a schematic diagram illustrating a wound core tunable resonator embodiment of this invention 745. Inductor 722 and capacitor 724 impedance match AC power source E 702 into dielectrically coupled resonator 746. Resonator 746 consists of MLCC capacitors 736, 738, 740 and 742 and inductor 726. Control 734 modifies the voltage from the source 732 to vary the capacitance of the MLCC capacitors via resistors 728 and 730. Resistor 744 provides a DC reference for capacitors 738 and 740. The control methodology is as described for FIGS. 3A and 3B. Inductor 726 consists of a ferrite core wound with a small number of turns, such as multifilar, designed to minimize both the AC and DC resistance of the winding. In conjunction with the tuned MLCC capacitors, this very low resistance winding permits a high Q resonator resulting in large currents and large magnetic field generated by the inductor.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

The invention claimed is:

1. An electrical resonator having a primary resonant frequency value $f_R$, the resonator comprising:
   a conductor having an inductance value L;
   a plurality of capacitors coupled to the conductor having a net capacitance value C disposed to provide a primary resonant frequency value $f_R$<500 kHz, wherein the capacitance value of at least one of the capacitors varies as a function of the voltage drop across it; and
   a controller coupled to the at least one of the capacitors, including
      first circuit means for generating a control voltage $V_C$ corresponding to the difference between a first predetermined resonant frequency value $f_{R1}$ and the primary resonant frequency value $f_R$<500 kHz, and
      second circuit means for applying the control voltage $V_C$ to the at least one of the capacitors, thereby obtaining the capacitance value C necessary to produce a primary resonant frequency value $f_R=f_{R1}$.

2. The electrical resonator of claim 1 wherein the conductor consists essentially of a single conductor disposed to form no more than a single loop.

3. The electrical resonator of claim 2 wherein the conductor consists essentially of a hollow elongate member having a wall with a longitudinal slot disposed along the entire length thereof; and one or more of the plurality of capacitors are conductively coupled across the longitudinal slot in the conductor wall.

4. The electrical resonator of claim 3 further comprising a ferromagnetic core moveably disposed within the hollow elongate member.

5. The electrical resonator of claim 4 further comprising means for moving the ferromagnetic core responsive to the difference between a second predetermined resonant frequency value $f_{R2}$ and the primary resonant frequency value $f_R$<500 kHz, thereby obtaining the inductance value L necessary to produce a primary resonant frequency value $f_R=f_{R2}$.

6. The electrical resonator of claim 1 wherein at least one of the plurality of capacitors includes a plurality of ceramic layers coupled conductively in parallel.

7. The electrical resonator of claim 1 wherein at least one of the plurality of capacitors includes a piezoelectric ceramic dielectric material.

8. The electrical resonator of claim 1 wherein at least some of the plurality of capacitors are coupled in parallel, thereby reducing the Equivalent Series Resistance (ESR) of the capacitors and increasing the Quality Factor value Q.

9. The electrical resonator of claim 1 further comprising, in the conductor, a plurality of insulated conductors conductively coupled in parallel and bundled together, thereby reducing the ESR of the conductor and increasing the Quality Factor value Q.

10. The electrical resonator of claim 1 further comprising:
a coupling circuit disposed to accept alternating current from an electrical power source, including a second plurality of capacitors coupled to the conductor having a net capacitance value $C_2$ disposed to introduce a coupling coefficient k with the electrical power source, wherein the capacitance value of at least one of the second plurality of capacitors varies as a function of the voltage drop across it; and
a second controller coupled to the at least one of the second plurality of capacitors, including
third circuit means for generating a second control voltage $V_{C2}$ corresponding to the difference between a first predetermined coupling coefficient $k_1$ and the a coupling coefficient k, and
fourth circuit means for applying the control voltage $V_{C2}$ to the at least one of the second plurality of capacitors, thereby obtaining the capacitance value $C_2$ necessary to introduce a coupling coefficient $k=k_1$.

11. The electrical resonator of claim 1 further comprising, in the controller, third circuit means for modulating the first predetermined resonant frequency value $f_{R1}$ according to a signal modulation scheme, whereby the primary resonant frequency value $f_R=f_{R1}$ is varied according to the signal modulation scheme.

12. A transmitter apparatus for inducing alternating current in a buried conductor, comprising:
an electrical power source for generating an alternating current; and
an electrical resonator coupled to the electrical power source and having a primary resonant frequency value $f_R$, the electrical resonator including
a conductor having an inductance value L;
a plurality of capacitors coupled to the conductor having a net capacitance value C disposed to provide a primary resonant frequency value $f_R<500$ kHz, wherein the capacitance value of at least one of the capacitors varies as a function of the voltage drop across it; and
a controller coupled to the at least one of the capacitors, including
first circuit means for generating a control voltage $V_C$ corresponding to the difference between a first predetermined resonant frequency value $f_{R1}$ and the primary resonant frequency value $f_R<500$ kHz, and
second circuit means for applying the control voltage $V_C$ to the at least one of the capacitors, thereby obtaining the capacitance value C necessary to produce a primary resonant frequency value $f_R=f_{R1}$.

13. The apparatus of claim 12 wherein the conductor consists essentially of a single conductor disposed to form no more than a single loop.

14. The apparatus of claim 13 wherein:
the conductor consists essentially of a hollow elongate member having a wall with a longitudinal slot disposed along the entire length thereof; and
one or more of the plurality of capacitors are conductively coupled across the longitudinal slot in the conductor wall.

15. The apparatus of claim 14 further comprising a ferromagnetic core moveably disposed within the hollow elongate member.

16. The apparatus of claim 15 further comprising means for moving the ferromagnetic core responsive to the difference between a second predetermined resonant frequency value $f_{R2}$ and the primary resonant frequency value $f_R<500$ kHz, thereby obtaining the inductance value L necessary to produce a primary resonant frequency value $f_R=f_{R2}$.

17. The apparatus of claim 12 wherein at least one of the plurality of capacitors includes a plurality of ceramic layers coupled conductively in parallel.

18. The apparatus of claim 12 wherein at least one of the plurality of capacitors includes a piezoelectric ceramic dielectric material.

19. The apparatus of claim 12 wherein at least some of the plurality of capacitors are coupled in parallel, thereby reducing the Equivalent Series Resistance (ESR) of the capacitors and increasing the Quality Factor value Q.

20. The apparatus of claim 12 further comprising, in the conductor, a plurality of insulated conductors conductively coupled in parallel and bundled together, thereby reducing the ESR of the conductor and increasing the Quality Factor value Q.

21. The apparatus of claim 12 further comprising an electrical conductor conductively disposed between the electrical resonator and the electrical power source.

22. The apparatus of claim 12 further comprising:
a coupling circuit disposed between the electrical resonator and the electrical power source including a second plurality of capacitors coupled to the conductor having a net capacitance value $C_2$ disposed to introduce a coupling coefficient k, wherein the capacitance value of at least one of the second plurality of capacitors varies as a function of the voltage drop across it; and
a second controller coupled to the at least one of the second plurality of capacitors, including
third circuit means for generating a second control voltage $V_{C2}$ corresponding to the difference between a first predetermined coupling coefficient $k_1$ and the a coupling coefficient k, and
fourth circuit means for applying the control voltage $V_{C2}$ to the at least one of the second plurality of capacitors, thereby obtaining the capacitance value $C_2$ necessary to introduce a coupling coefficient $k=k_1$.

23. The apparatus of claim 12 further comprising, in the controller, third circuit means for modulating the first predetermined resonant frequency value $f_{R1}$ according to a signal modulation scheme, whereby the primary resonant frequency value $f_R=f_{R1}$ is varied according to the signal modulation scheme.

24. A human-portable locator system for locating a buried conductor, comprising:
a transmitter apparatus for inducing alternating current in the buried conductor, including
an electrical power source for generating an alternating current; and an electrical resonator coupled conductively to the electrical power source and having a resonant frequency value $f_R$, including
a conductor having an inductance value L;
a plurality of capacitors coupled to the conductor having a net capacitance value C disposed to provide a primary resonant frequency value $f_R<500$ kHz, wherein the capacitance value of at least one of the capacitors varies as a function of the voltage drop across it; and
a controller coupled to the at least one of the capacitors, including
first circuit means for generating a control voltage $V_C$ corresponding to the difference between a first predetermined resonant frequency value $f_{R1}$ and the primary resonant frequency value $f_R<500$ kHz, and
second circuit means for applying the control voltage $V_C$ to the at least one of the capacitors, thereby obtaining the capacitance value C necessary to produce a primary resonant frequency value $f_R=f_{R1}$;
a sensor array for producing a plurality of sensor signals representing an electromagnetic field emission arising from the alternating current in the buried conductor;
a processor coupled to the sensor array for producing location data signals representing a location of the electromagnetic field emission corresponding to the sensor signals; and
a user interface coupled to the processor for reporting to a user a location for the buried conductor.

25. The system of claim 24 wherein the conductor consists essentially of a single conductor disposed to form no more than a single loop.

26. The system of claim 25 wherein:
the conductor consists essentially of a hollow elongate member having a wall with a longitudinal slot disposed along the entire length thereof; and
one or more of the plurality of capacitors are conductively coupled across the longitudinal slot in the conductor wall.

27. The system of claim 26 further comprising:
a ferromagnetic core moveably disposed within the hollow elongate member; and
means for moving the ferromagnetic core responsive to the difference between a second predetermined resonant frequency value $f_{R2}$ and the primary resonant frequency value $f_R<500$ kHz, thereby obtaining the inductance value L necessary to produce a primary resonant frequency value $f_R=f_{R2}$.

28. The system of claim 24 further comprising an electrical conductor conductively disposed between the electrical resonator and the electrical power source.

29. The system of claim 24 further comprising:
a coupling circuit disposed between the electrical resonator and the electrical power source including a second plurality of capacitors coupled to the conductor having a net capacitance value $C_2$ disposed to introduce a coupling coefficient k, wherein the capacitance value of at least one of the second plurality of capacitors varies as a function of the voltage drop across it; and
a second controller coupled to the at least one of the second plurality of capacitors, including
third circuit means for generating a second control voltage $V_{C2}$ corresponding to the difference between a first predetermined coupling coefficient $k_1$ and the a coupling coefficient k, and
fourth circuit means for applying the control voltage $V_{C2}$ to the at least one of the second plurality of capacitors, thereby obtaining the capacitance value $C_2$ necessary to introduce a coupling coefficient $k=k_1$.

30. The system of claim 24 further comprising, in the controller, third circuit means for modulating the first predetermined resonant frequency value $f_{R1}$ according to a signal modulation scheme, whereby the primary resonant frequency value $f_R=f_{R1}$ is varied according to the signal modulation scheme.

31. The system of claim 24 wherein the conductor consists of a ferrite core wound multifilar.

* * * * *